(12) United States Patent
Chintala et al.

(10) Patent No.: US 12,411,932 B2
(45) Date of Patent: Sep. 9, 2025

(54) PROVIDING ACCESS CONTROL FOR POLICIES

(71) Applicant: Snowflake Inc., Bozeman, MT (US)

(72) Inventors: Srilakshmi Chintala, Seattle, WA (US); Albert L. Hu, Seattle, WA (US); Ziliang Zhang, San Mateo, CA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/363,322

(22) Filed: Aug. 1, 2023

(65) Prior Publication Data

US 2024/0330430 A1 Oct. 3, 2024

Related U.S. Application Data

(63) Continuation of application No. 18/194,407, filed on Mar. 31, 2023, now Pat. No. 11,762,978.

(51) Int. Cl.
*H04L 29/06* (2006.01)
*G06F 21/44* (2013.01)
*G06F 21/53* (2013.01)

(52) U.S. Cl.
CPC .............. *G06F 21/44* (2013.01); *G06F 21/53* (2013.01); *G06F 2221/2141* (2013.01)

(58) Field of Classification Search
CPC ................................. G06F 21/44; G06F 21/31
See application file for complete search history.

(56) References Cited

U.S. PATENT DOCUMENTS

| 11,916,858 | B1* | 2/2024 | Mears .................... H04L 51/224 |
| 2003/0208636 | A1 | 11/2003 | Heddings et al. |
| 2014/0066015 | A1* | 3/2014 | Aissi ....................... H04W 4/60 |
| | | | 455/411 |
| 2015/0089625 | A1 | 3/2015 | Swanson et al. |
| 2019/0102121 | A1 | 4/2019 | Hayami |
| 2019/0310935 | A1 | 10/2019 | Shuster et al. |
| 2020/0084295 | A1* | 3/2020 | Hayward ............... H04L 51/063 |
| 2021/0141912 | A1 | 5/2021 | Mowatt et al. |
| 2022/0391357 | A1* | 12/2022 | Brossard ................ G06F 16/13 |

OTHER PUBLICATIONS

"U.S. Appl. No. 18/194,407, Notice of Allowance mailed Jun. 7, 2023".

* cited by examiner

*Primary Examiner* — Jason K Gee

(74) *Attorney, Agent, or Firm* — Schwegman Lundberg & Woessner, P.A.

(57) ABSTRACT

Methods, systems, and computer programs are presented for a policy to enable customers to create and apply allowed items and restricted items provided by third-party managers. User code is received by a cloud data platform, the code for performing an operation. The cloud data platform receives a policy including allowed items and restricted items. The cloud data platform compares the allowed and restricted items to a specification, and determines a difference based on the comparison. The cloud data platform determines whether to permit the operation based at least in part on the differences.

20 Claims, 10 Drawing Sheets

PROVIDING ACCESS CONTROL FOR POLICIES

PRIORITY CLAIM

This application is a continuation of U.S. application Ser. No. 18/194,407, filed Mar. 31, 2023, the content of which is incorporated herein by reference in its entirety.

TECHNICAL FIELD

The subject matter disclosed herein generally relates to methods, systems, machine-readable storage media, and programs for managing access to third-party packages in a cloud data platform and, more specifically, for providing users with granular access control of packages available within their environment.

BACKGROUND

Network-based database systems may be provided through a cloud data platform, which allows organizations, customers, and users to store, manage, and retrieve data from the cloud. With respect to this type of data processing, a cloud data platform could implement online transactional processing, online analytical processing, and/or other types of data processing. Moreover, a cloud data platform could be or include a relational database management system and/or one or more other types of database management systems.

Cloud-based data warehouses and other database systems sometimes provide support for custom user functions, such as a User-Defined Function (UDF) or stored procedures that enable such systems to perform operations that are not available through the built-in, system-defined functions. Existing techniques for the execution of UDFs, however, may lack robust security mechanisms for mitigating the associated security risks and ensuring that the user code is executed securely and with sufficient visibility for auditing.

BRIEF DESCRIPTION OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. Various ones of the appended drawings merely illustrate example embodiments of the present disclosure and should not be considered as limiting its scope.

DETAILED DESCRIPTION

Figure 1:
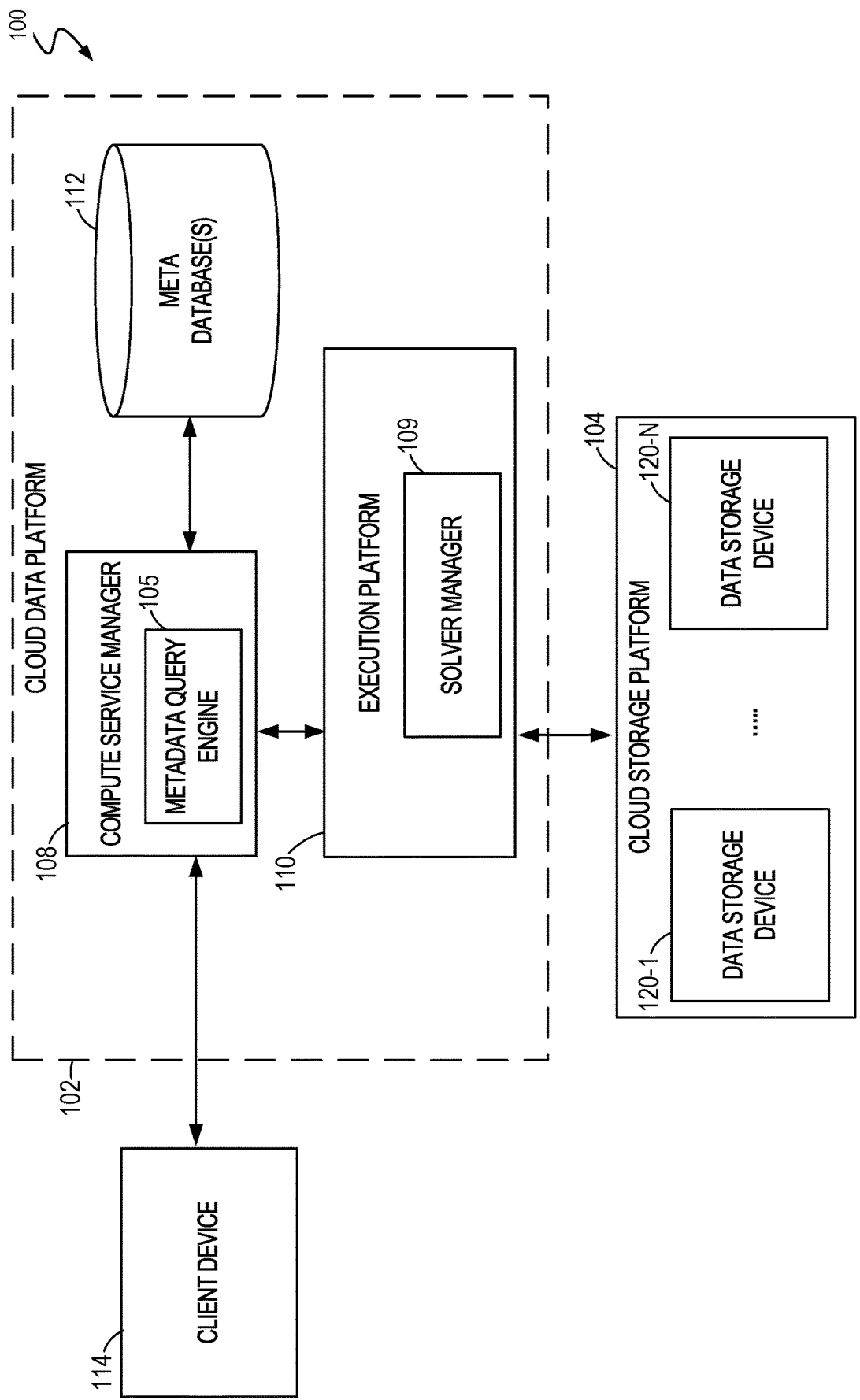
FIG. 1 illustrates an example computing environment that includes a cloud data platform in communication with a cloud storage provider system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques are not necessarily shown in detail.

Example embodiments of the present disclosure include a cloud data platform (e.g., a cloud-based data warehousing platform) that enables users to employ third-party packages provided by external package management systems or distributors (e.g., Anaconda), which can provide collections of pre-installed packages and/or libraries for data analysis, visualization, scientific computing, and the like. Once an organization (e.g., customer) of the cloud data platform accepts the use of third-party packages, any packages available on the cloud data platform are made available to all accounts associated with the organization. However, different customers may desire varying levels of granular access control to different packages. The cloud data platform packages policy object is a new policy object that provides access control lists to enable customers to set allowlists and blocklists for packages on the customer's account. These allowlists and blocklists can be applied during function creation and function execution for user functions created within the same account. More specifically, example embodiments provide for fine control over which packages are available and/or blocked in a customer's environment, providing for increased security requirements and stricter auditing control.

As discussed, it can be difficult to implement different programming language environments in a distributed database. As an example, Python is a popular language for data science and machine learning. Python data science and machine learning applications can require different packages or dependencies to function properly in a distributed database environment (e.g., virtual warehouses). One concern in implementing Python in a distributed database environment is dependency management. Dependencies include the software packages that are used by a given function or application (e.g., Python NumPy) that must be installed for the function to work as intended and avoid runtime errors. One approach is to require end-users to upload and manage all the required packages; however, this can be problematic because a given program language's versioning (e.g., Python versioning) can be unorganized and difficult to manage. Managing all the dependencies in this approach can result in negative development user experiences (e.g., extreme frustration encountered by end-users when installed software packages have dependencies on specific versions of other software packages). For instance, the dependency issue arises when several packages have dependencies on the same shared packages or libraries, but they depend on different, incompatible, and/or restricted versions of the shared packages. If the shared package or library can only be installed in a single version, the user may need to address the problem by obtaining newer or older versions of the dependent packages. This, in turn, may break other dependencies and push the problem to another set of packages. Furthermore, requiring users to install and manage hundreds of packages is insecure, cumbersome, and error prone. Another approach is to only integrate a small set of dependencies out of the box on the distributed database. However, this approach sets a hard limit on application functionality, and users will not be able to tap into the full Python ecosystem. A third approach is to allow users to opt-in to third-party package management systems integrated with the cloud data platform. However, this approach requires customer accounts to be exposed to all third-party packages, leading customers instead to opt-out of all third-party packages instead of risking security vulnerabilities related to exposure to unknown or undesirable packages.

Traditional approaches for controlling the use of third-party packages include allow lists that identify items that are considered safe and are permitted and block lists that identify items that are considered unsafe, suspicious, and are therefore blocked from access or use. These lists may be used to restrict access to resources or actions based on a predefined set of rules. For example, pre-existing solutions allow a customer to block all packages provided by third-party managers or allow all packages provided by third-party managers, where allowance will expose a customer to every single package provided by the third-party manager. This results in customers declining to enable third-party package inclusion for their organization, which results in customer queries failing and leaving customer's environments non-executable. Such traditional approaches fail to provide a customer with adequate, desirable, or granular control over the packages or versions of packages made available to the customer's accounts.

Example embodiments of the present disclosure overcome the technical challenges relating to granular package control by providing for packages policy objects that allow users to specify an allowlist and/or a blocklist that is applied over a customer account on the cloud data platform. The methods, systems, and computer programs described herein allow customers to specify which packages they want their account to be exposed to and enable customers to maintain control over which packages are allowed to be used and which packages are not allowed to be used by their account(s). Such allowlist and blocklist management allows users to specify which packages are allowed and/or not allowed in the account, providing users more granular access control over the packages that are available within their environment. The packages policy object can be an allowlist and blocklist that is applied during function creation and/or execution time, which will fail the query if the packages being used are not allowed by the packages policy object.

For purposes of this description, the packages policy object allowlist and blocklist can be applied during creation time and execution time of a User-Defined Function (UDF), User-Defined Table Function (UDTF), User-Defined Aggregation Function (UDAF), or other stored procedures used in relational databases for performing complex data processing tasks, enforcing business rules, and the like. However, for simplicity, the detailed embodiments will describe examples of the packages policy object including allowlists and blocklists that are applied during UDF creation and execution time, but it will be understood that the same principles may be used for other types of database logic and programmatic constructs.

According to some example embodiments, the packages policy object can be a schema-level object (e.g., tables, views, stored procedures, or other database objects) that is applied on an entire account or virtual environment in which the organization (e.g., users associated with the account) can store, process, and analyze their data using custom functions or procedures. The ability to create and apply package policies can be granted to an account administrator or otherwise provided as a privilege to other roles associated with the account. In some example embodiments, for a package to be allowed, the package must be explicitly allowed by the allowlist and not explicitly blocked by the blocklist. In alternative example embodiments, for a package to be allowed, the package must be explicitly allowed by the allowlist, or the package must not explicitly be blocked by the blocklist.

Example embodiments of the packages policy system are applied at both UDF creation time and UDF execution time. At creation time, the cloud data platform transmits the allowlist and blocklist to a package solver system. In addition, the cloud data platform passes, to the package solver system, a list of packages (e.g., a repodata.json packages file) that includes information on every package available on the cloud data platform. To avoid examining thousands of packages, a process known as "pruning" is often performed as part of processing queries. Pruning involves using metadata to determine which packages are not pertinent to the packages policy object and/or UDF, avoiding those non-pertinent packages when trying to solve for a customer's requested packages and/or environments, and sharing only the pertinent packages to create the UDF, execute the UDF, and/or save a list of dependencies.

When the list of all packages available is passed to the package solver system, the cloud data platform (or component thereof) prunes the metadata associated with the list of packages so that only packages allowed by the packages policy are allowed (otherwise it will fail the query). At execution time, the cloud data platform generates, maintains, or receives a list of packages that are required by the UDF. The cloud data platform performs a check against the active packages policy to confirm that all of the required dependencies are allowed. If all dependencies are confirmed to be allowed, the execution will continue as expected (otherwise the query will fail).

In some example embodiments, an organization (e.g., customer) may discover that a programming language package (e.g., Python package) that the customer is using within the cloud data platform has a vulnerability that exceeds the organization's tolerance. In such scenarios, the organization can immediately block that specific package using a blocklist until the vulnerability is patched. In additional example embodiments, the organization can create a conditional allowlist for automatically adding a package to a blocklist when a vulnerability is identified, and automatically removing the package from the blocklist and/or adding the package to the allowlist when the vulnerability is resolved.

In some example embodiments, if an organization has not fully vetted a particular package, the organization can add the package to a blocklist so the package will not be allowed to be used within the cloud data platform until the organization has performed a security review. Once reviewed, the organization can add the package to the allowlist (and/or remove the package from a blocklist) via the packages policy. In such cases, newly added packages and/or new versions of existing packages to the cloud data platform will not automatically be included in a user's execution environment, which can reduce the risk of a security vulnerability.

In additional example embodiments, some organizations may be in highly regulated industries that have specific package requirements, audit requirements, or specific regulations. Example embodiments of the allowlist and blocklist package policy enable a user to point to the packages policy object and provide an exact list and/or timeline of packages the organization uses (e.g., via the allowlist), and provide the opposing information including a list of packages the organization restricts or does not allow (e.g., via the blocklist).

In computer security, a sandbox (e.g., sandbox environment) is a security mechanism for separating running programs, usually to prevent system failures or prevent exploitation of software vulnerabilities. A sandbox can be used to execute untested or untrusted packages, programs, functions, or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDFs typically can run in a sandbox environment. Some example embodiments of the packages policy object system described herein can be run within a sandbox environment, which is described and depicted in more detail in connection with FIG. 4.

Example embodiments include technical solutions over prior package policy attempts in a database system by implementing a system providing granular control of package usage on a per-object basis. Example embodiments further enable continuous evolution of the packages policy object by providing customers the ability to update the allowlist and blocklist on a per-package basis, per-package version basis, per-environment basis, per-account basis, or other increment at any time.

FIG. 1 illustrates an example computing environment 100 that includes a database system in the example form of a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the cloud data platform 102 in communication with a cloud storage platform 104 (e.g., AWS®, Microsoft Azure Blob Storage®, or Google Cloud Storage). The cloud data platform 102 is a network-based system used for reporting and analysis of integrated data from one or more disparate sources including one or more storage locations within the cloud storage platform 104. The cloud data platform 102 can be a network-based data platform or network-based data system. The cloud storage platform 104 comprises a plurality of computing machines and provides on-demand computer system resources such as data storage and computing power to the cloud data platform 102.

The cloud data platform 102 comprises a compute service manager 108, an execution platform 110, and one or more metadata databases 112. The cloud data platform 102 hosts and provides data reporting and analysis services to multiple client accounts.

The compute service manager 108 coordinates and manages operations of the cloud data platform 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the cloud data platform 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the cloud data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N can be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

The compute service manager 108, metadata database(s) 112, and execution platform 110 are operatively connected to a solver manager 109, which provides for the monitoring of allowlist(s) and blocklist(s) and determination of packages available for use. The solver manager 109 can receive packages policy object information from any of the compute service manager 108, metadata database(s) 112, execution platform 110, or alternative operatively connected modules from within the cloud data platform 102, or externally connected data sources. The solver manager 109 is depicted and described in combination with FIG. 7.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, solver manager 109, and cloud storage platform 104 are shown in FIG. 1 as individual discrete components. However, each of the compute service manager 108, metadata database(s) 112, execution platform 110, solver manager 109, and cloud storage platform 104 can be implemented as a distributed system (e.g., distributed across multiple systems/platforms at multiple geographic locations). Additionally, each of the compute service manager 108, metadata database(s) 112, execution platform 110, solver manager 109, and cloud storage platform 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a suitable candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

According to some example embodiments, packages policy objects, and more specifically an allowlist and a blocklist (e.g., one or more allowlist(s) and one or more blocklist(s)), can be controlled using the cloud data platform 102 to communicate and implement the packages policy object. The compute service manager 108 can be configured to check if there is a conflict among the allowlist and blocklist and at least one package specification (e.g., any top-level package specifications, dependencies, package specifications, etc.), and the execution platform 110 or a component thereof such as the solver manager 109 can be configured to remove the specific conflicting packages and make sure that the cloud data platform 102 does not use the blocked packages. For example, using a metadata query engine 105, the cloud data platform can obtain the allowlist and blocklist from a metadata object in the compute service manager 108, and pass the original allowlist and blocklist to the execution platform 110. The execution platform 110 can determine the blocked packages to remove before solving a packages determination. For example, the cloud data platform 102 can use a policy framework that maps policy class objects to the underlying storage, data access objects (DAO), or the like.

In some example embodiments, the cloud data platform 102 can obtain or receive a package policy object (e.g., a packages policy object) specified on an account. The packages policy object will include an allowlist and a blocklist, where the allowlist and the blocklist can be applied to all packages requested by the user, including dependencies of the top-level packages specified by the user. If the allowlist is not the default value (e.g., "*"), the cloud data platform transmits the allowlist directly to the execution platform 110. Otherwise, the cloud data platform will transmit the allowlist. The cloud data platform can transmit one allowlist and one blocklist as a string JSON list to the execution platform 110. In additional example embodiments, each package policy can include at least one top-level allowlist, at least one all-package allowlist, and at least one blocklist; in additional examples, varying levels and dependencies can be specified and used, as well as varying types of more detailed allowlists and blocklists.

The solver manager 109 is illustrated as a component of execution platform 110; however, additional example embodiments of the solver manager 109 can be implemented by any of the virtual warehouses of the execution platform 110, such as the execution node 302-1, compute service manager 108, the request processing service 208, the packages policy object 230, the package solver manager 402, and/or external components of the cloud data platform 102 in accordance with some embodiments of the present disclosure.

Aspects of the present disclosure provide techniques for granular access control of a packages policy. In particular, various embodiments enable enforcement of one or more packages policies against an entity (e.g., object) of a cloud data platform, such as a database, a table, a row, or a column, based on one or more allowlist(s) and/or blocklist(s) associated with the entity. Various embodiments described herein can be used to reduce manual effort in assigning (e.g., mapping, associating, applying) a packages policy to individual functions, environments, accounts, users, and the like.

Figure 2:
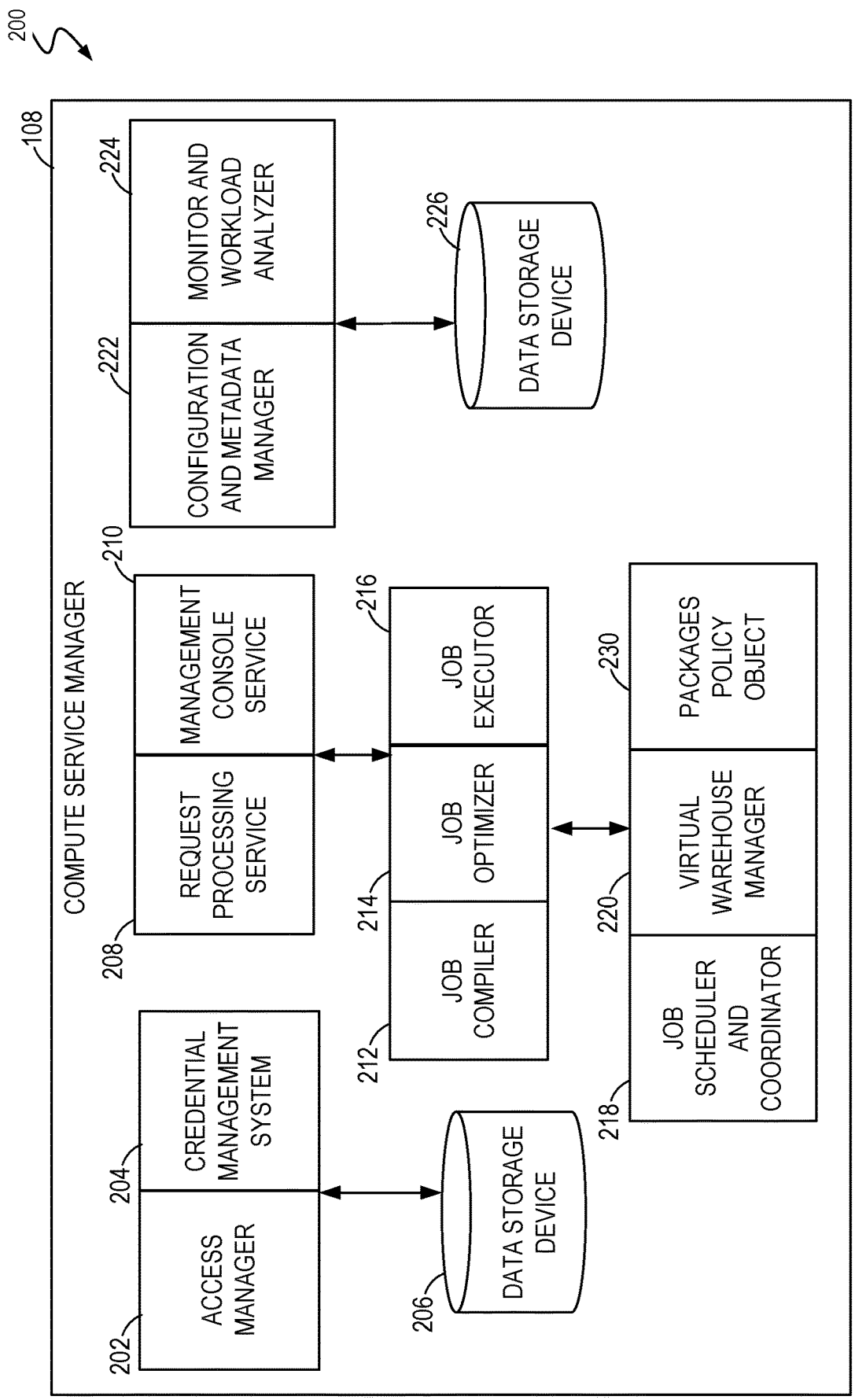
FIG. 2 is a block diagram illustrating components of a compute service manager, according to some example embodiments.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to access data storage device 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs can be prioritized and then processed in that prioritized order. In an embodiment, the job scheduler and coordinator 218 determines a priority for internal jobs that are scheduled by the compute service manager 108 with other "outside" jobs such as user queries that can be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The compute service manager 108 further includes a packages policy object 230, which manages the packages policy object associated with customer accounts. The packages policy object 230 is described in detail in connection with FIG. 5.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the cloud data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
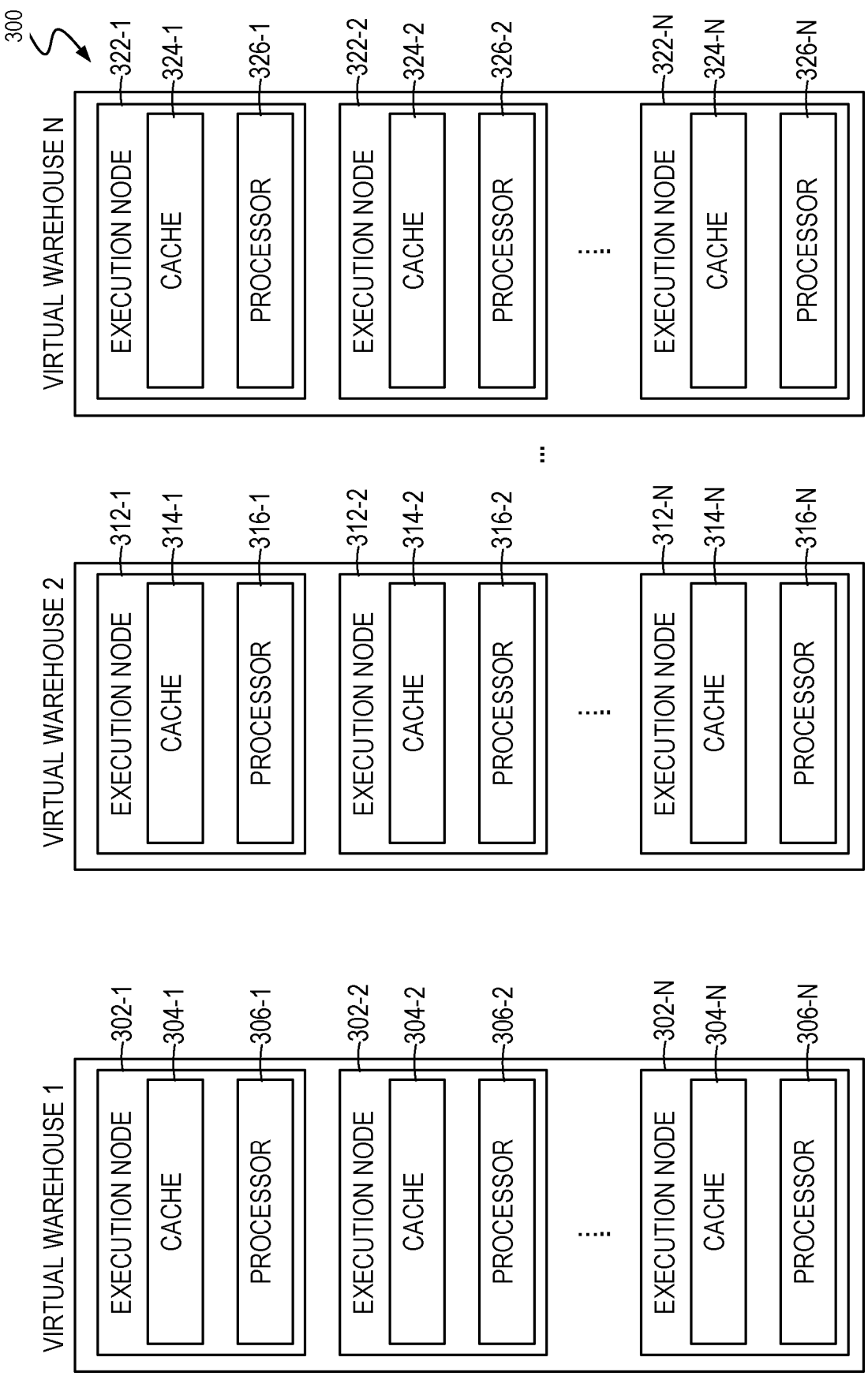
FIG. 3 is a block diagram illustrating components of an execution platform, according to some example embodiments.

FIG. 3 is a block diagram 300 illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
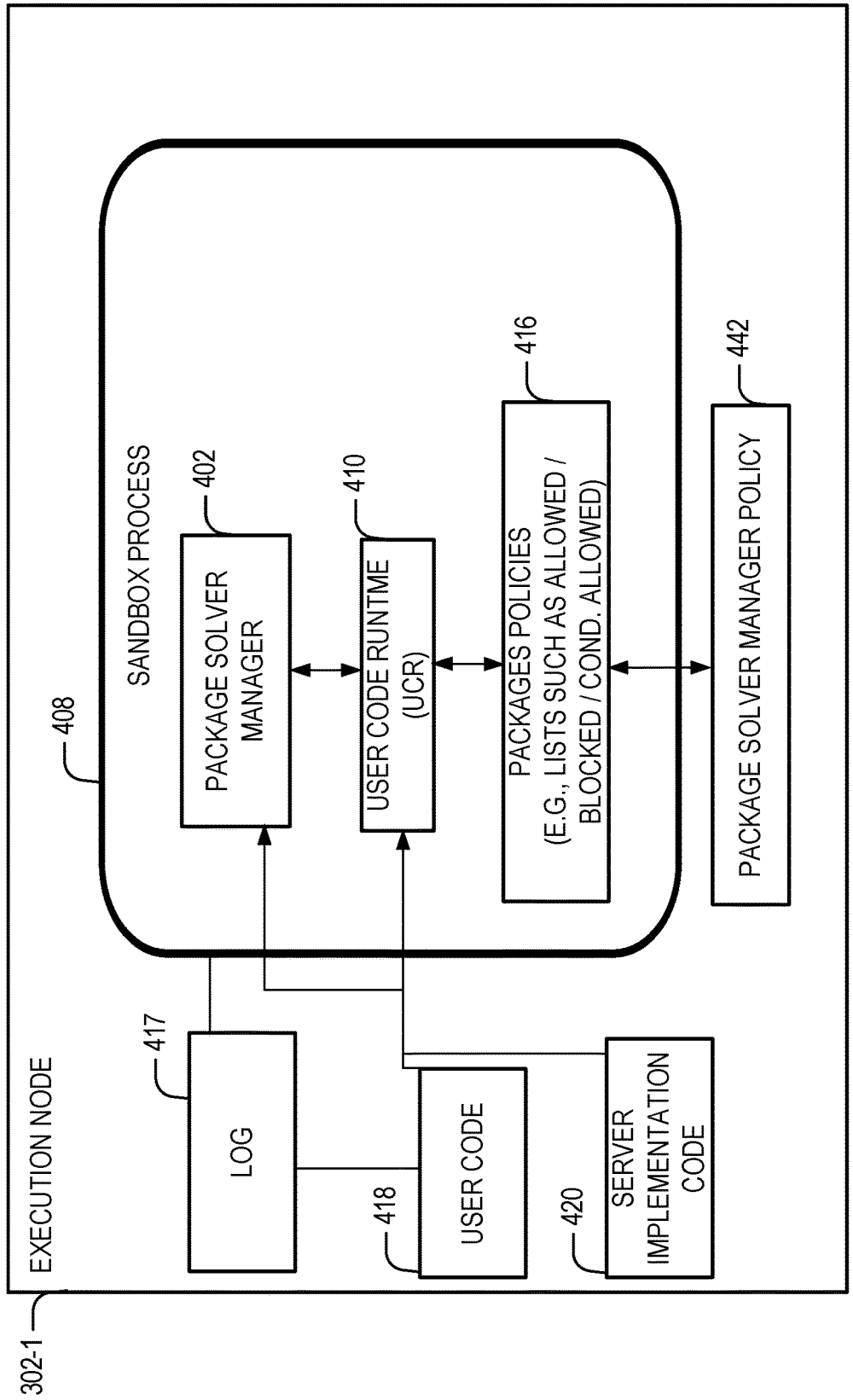
FIG. 4 is a computing environment conceptually illustrating an example software architecture executing a user-defined function (UDF) by a process running on a given execution node of the execution platform, according to some example embodiments.

FIG. 4 is a computing environment 400 conceptually illustrating an example software architecture executing a user-defined function (UDF) by a package solver manager 402 running on a given execution node of the execution platform 110 of FIG. 3, in accordance with some embodiments of the present disclosure.

As illustrated, the execution node 302-1 from the execution platform 110 includes the package solver manager 402 (e.g., similar to solver manager 109 of FIG. 1), which in an embodiment is running on the processor 306-1 and can also utilize memory from the cache 304-1 (or another memory device or storage). As mentioned herein, a "process" or "computing process" can refer to an instance of a computer program that is being executed by one or more threads of an execution node or execution platform. The instance of a computer program can be instantiated by the execution platform 110. For example, the execution node 302-1 can be configured for instantiating a user code runtime to execute the code of the UDF and/or to create a runtime environment that allows the user's code to be executed. The user code runtime can include an access control process including an access control list, where the access control list includes at least one allowlist and/or at least one blocklist.

The package solver manager 402 comprises suitable circuitry, logic, interfaces, and/or code and is configured to perform functionalities in connection with the creation and execution of UDF system calls. For example, the package solver manager 402 (also referred to herein as "package solver" or simply "solver") can be code to receives as input what packages are to be solved for, the list of packages that are available to the system, and a list of packages that should be removed from the list of packages that are available to the system. More specifically, the package solver manager 402 is configured to perform functionalities (e.g., as described in connection with FIG. 5-FIG. 7). Instantiating a sandbox process including the solver manager 402, where the solver manager can determine whether the UDF is permitted and instantiating the user code runtime as a child process of the sandbox process, the sandbox process configured to execute the at least one operation in a sandbox environment.

In some example embodiments, a package may be blocked by a filtering process within the execution node 302-1, which leads to a failure or unknown behavior in the user code. In this case, the package solver manager 402 can return an error notification (e.g., message, log entry, etc.) to the user providing an explanation of what package was blocked. In additional example embodiments, the package solver manager 402 within the execution node 302-1 can provide visibility on which package is blocked and it may report the root cause to the user for further retrospective analysis.

As illustrated in FIG. 4, the execution node 302-1 includes a sandbox process 408, which includes the package solver manager 402. In some example embodiments, the package solver manager 402 is configured to execute as a child process (or a sub-process) of the sandbox process 408. The sandbox process 408 includes a user code runtime 410, which is configured to execute as a child process (or a sub-process) of the sandbox process 408. The package solver manager 402 is in communication with packages policies 416, and also has access to log 417, user code 418, and server implementation code 420.

The sandbox process 408, in an embodiment, is a program that reduces the risk of security breaches by restricting the running environment of untrusted applications, packages, or functions using security mechanisms such as namespaces and secure computing modes (e.g., using a system call filter to an executing process and all its descendants, thus reducing the attack surface of the kernel of a given operating system). Moreover, in an example, the sandbox process 408 is optimized (e.g., tightly coupled to security mechanisms via the user code runtime 410) to process a database query securely within a sandbox environment.

In an embodiment, the sandbox process 408 can utilize a virtual network connection to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations, packages, versions of packages, or sites on the Internet.

The sandbox process 408 can be understood as providing a constrained computing environment for a process (or processes), such as the user code runtime 410 executing UDF code within the sandbox, where these constrained processes can be controlled and restricted to limit access to a kernel and/or certain computing resources.

Examples of security mechanisms used by the sandbox process 408 or a component thereof can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. In some aspects, the sandbox process 408 can utilize a sandbox policy to enforce a given security policy. The sandbox policy can be a file with information related to a configuration of the sandbox process 408 and details regarding restrictions if any, and permissions for accessing and utilizing system resources. Example restrictions can include restrictions to network access, or file system access (e.g., remapping file system to place files in different locations that may not be accessible, other files can be mounted in different locations, and the like). The sandbox process 408 may restrict the memory and processor (e.g., CPU) usage of the user code runtime 410, ensuring that other operations on the same execution node can execute without running out of resources. Additional package control functions are performed by the packages policies 416 as further detailed in connection with FIG. 5-FIG. 7.

In some example embodiments, user code 418 may be provided as a package (e.g., in the form of a JAR (JAVA archive) file), which includes code for one or more UDFs. Server implementation code 420, in an embodiment, can be a JAR file that initiates a server that is responsible for receiving requests from the user code runtime 410, assigning worker threads to execute user code, and returning the results, among other types of server tasks.

In an implementation, an operation from a UDF (e.g., Python UDF, JAVA-based UDF, etc.) can be performed by the user code runtime 410 executing within the sandbox process 408. In an embodiment, the user code runtime 410 is implemented as a virtual machine, such as a JAVA virtual machine (JVM), a Python runtime, or another type of runtime for executing user code of a UDF or the like. In further embodiments, results of performing an operation based on the UDF, among other types of information or messages, can be stored in log 417 for review and retrieval, such as for auditing packages policies. In an embodiment, the log 417 can be stored locally in memory at the execution node 302-1, or a separate location such as the cloud storage platform 104.

Package solver manager 402, in an example, can prevent completion of an operation from a given UDF by throwing an exception (e.g., if the operation (or package) is not permitted), or returns (e.g., doing nothing) if the operation (or package) is permitted. In an implementation, the package solver manager 402 can be implemented as a Python manager object that allows applications or functions to implement a policy such as a package solver manager policy 442, and enables an application or function to determine, before performing a possibly unsafe or sensitive operation, what the operation is and whether it is being attempted in a security context that allows the operation to be performed. The package solver manager policy 442 can be implemented as a file with permissions that the user code runtime 410 is granted. The application (e.g., UDF executed by the user code runtime 410) therefore can allow or disallow the operation based at least in part on the package solver manager policy 442.

Although the above discussion of FIG. 4 describes components that are implemented using JAVA (e.g., object-oriented programming language), it is appreciated that the other programming languages (e.g., interpreted programming languages) are supported by the package solver manager 402. In an embodiment, PYTHON is supported for implementing and executing UDFs in the computing environment of the package solver manager 402. In this example, the user code runtime 410 can be replaced with a PYTHON interpreter for executing operations from UDFs (e.g., written in PYTHON) within the sandbox process 408. In an embodiment, a UDF client (not shown) can be implemented in a different programming language (e.g., C or C++) than the user code 418, which can further improve security of the computing environment 400 by using a different codebase (e.g., one with the same or fewer potential security exploits).

Figure 5:
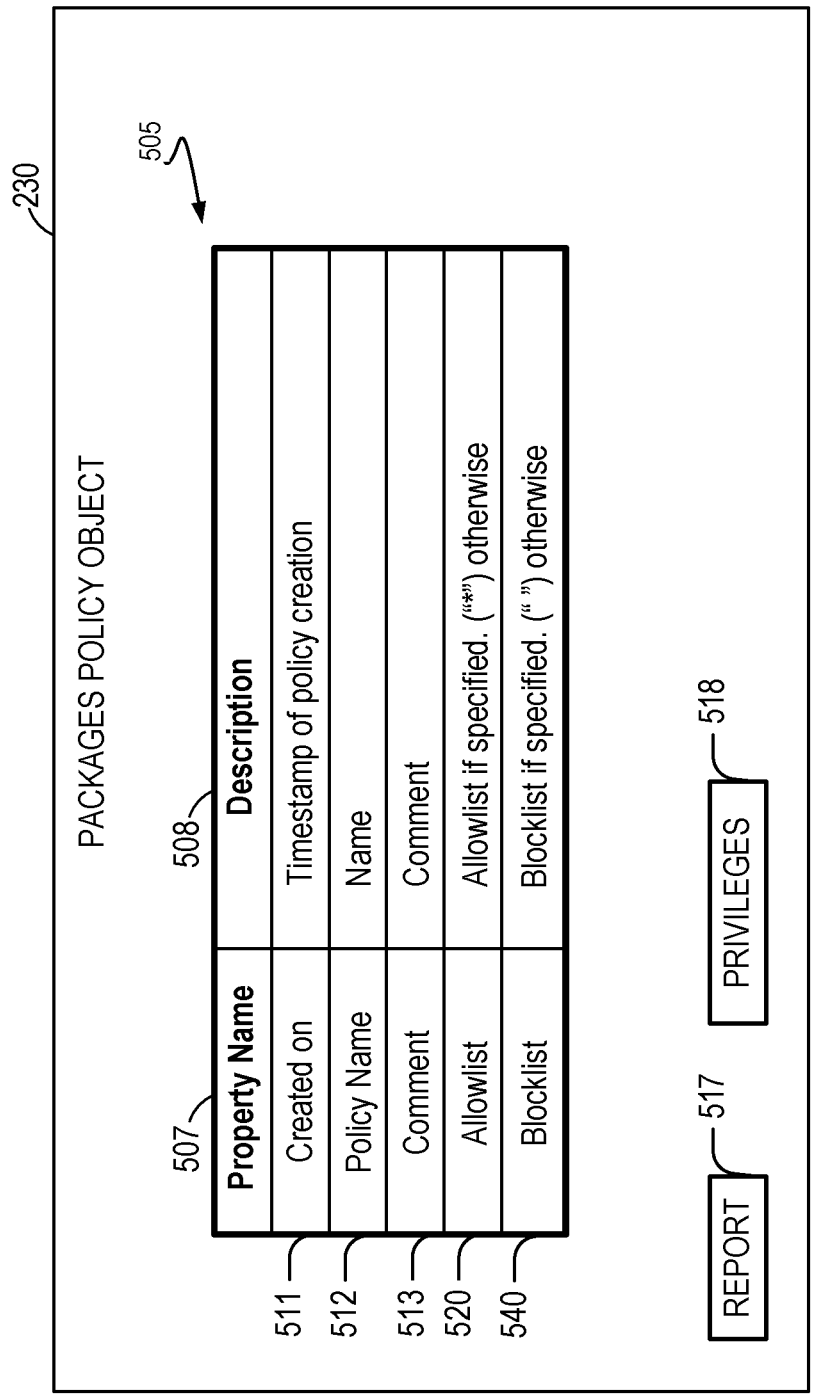
FIG. 5 is a block diagram illustrating an example package policy object, according to some example embodiments.

FIG. 5 shows a block diagram 500 illustrating an example embodiment of the packages policy object 230, which includes rules, instructions, and details for managing an allowlist and a blocklist based on a packages policy object, in accordance with some example embodiments. According to some example embodiments, the packages policy object 230 can be operatively interconnected with the packages policies 416 of the package solver manager 402 as described and depicted in connection with FIG. 4. According to additional example embodiments, the packages policy object 230 can be implemented outside of the sandbox process 408.

A packages policy object is an object that is used in software package management to define a rule or set of rules or policies for how packages can be installed, updated, used, authorized, and the like on a system. These rules or instructions can define how packages can be managed by customers of a cloud data platform on a per-account, per-schema, per-database, or cloud data platform access information. The packages policy object can include instructions for managing (e.g., using, authorizing, excluding, blocking, etc.) dependencies, specifying the version of a package to be used, defining how to handle conflicts between different packages, and the like. Packages policy objects can be customized by account or customer administrators (or other privileged users) to modify the default behavior of the package management in order to meet the particular needs of a customer, account, or environment.

Packages policy objects (also referred to herein as packages policies) provide a customer of the cloud data platform 102 with the ability to block specific packages or sets of packages that do not pass internal security requirements or are otherwise undesirable to the customer, and to specifically allow the packages that have been tested or approved by the customer for use in the customer's environment(s). The packages policy object 230 can manage packages, which can be schema-level objects that an authorized user of a customer can set for a customer on an account-level, user-level, environment-level, function-level, or other object basis.

In the example embodiment of FIG. 5, the packages policy object 230 provides a table with at least some information relating to at least one packages policy of a customer and/or a specific account of a customer of the cloud data platform 102. The packages policy object 230 includes a table 505 with policy data properties and description, including property name 507 and description 508. The packages policy table 505 provides for different properties, including, for example, created on 511, policy name 512, comment 513, allowlist 520, and blocklist 540. Additional details related to the allowlist 520 and the blocklist 540 are depicted and described in more detail in connection with FIG. 6.

In additional example embodiments of the packages policy tables, additional and/or alternative fields other than properties and description can be included to provide greater or less detail related to the packages policy object 230. The packages policies table fields can be updated at an account level, user level, customer level, or the like, in order to provide customization on a per-user basis or according to organization procedures.

For example, the packages policy object 230 can provide a report 517, which may vary according to different syntaxes applicable to schemas, databases, accounts, or other objects. In one example of the packages policy object 230, the report 517 can include creation time, policy name, database name, schema name, kind of policy, owner of policy, comments, and/or other data.

According to example embodiments, customers desire role-based access control (e.g., security) over third-party packages, where the role-based access control can be used to control access of the databases, tables, warehouses, functions, and the like within the cloud data platform. The role-based access control provides granular object control within the cloud data platform, so the customer (e.g., organization) can delegate to specific individuals (e.g., privileged users, specific roles) and set the packages policy object on an account-level, database-level, schema-level, or other object-level.

For example, the packages policy object 230 includes rules associated with privileges 518 for the creating, dropping, altering, applying updating, and/or additional actions or operations of the packages policy object. In order to provide granular access control of packages from third-party package managers to customers of the cloud data platform 102, the cloud data platform can automatically set and/or a customer can request differing privileges for different users to perform any actions on one or more packages policy object(s). Different customers can customize their privileges for their users, and update or modify the privileges on a per-privilege, per-action, or other meaningful role-based system for granting privileges.

In some example embodiments, in order to create a packages policy object, users may need a new grantable privilege (e.g., CREATE PACKAGES POLICY), which can be granted to certain users (e.g., security admin, account admin, etc.) by default. For example, the create package policy may be automatically set to a relatively low-level privilege, such that anyone who has the permission to create a schema has the ability to create this policy object. Access to the schema can be granted or revoked for specific users or roles, providing additional control of who can view or modify specific database objects within the schema. In some example embodiments, once a packages policy object is created, users may need a new grantable privilege (e.g., APPLY PACKAGES POLICY privilege) on the account in order to set the packages policy object on the account (e.g., using ALTER ACCOUNT SET PYTHON PACKAGES_POLICY=<POLICY_NAME>). In addition to having the APPLY PACKAGES POLICY on account, users may also need to either have OWNERSHIP or APPLY ON the packages policy object in order to perform specific actions.

For example, in some implementation examples, the cloud data platform may default to add a privilege, which is by default granted to certain users (e.g., account admins), which will allow the user to set the allowlist(s) and blocklist(s) for their account. These lists can be stored in a new object (e.g., a PythonPackagesPolicy). Once specified, these lists can be automatically applied to all non-built-in UDFs in the account. For both the allowlist and the blocklist, packages can be specified as a string, delimited by commas. Packages may be specified as either just the package name (e.g., equivalent to packagename==*) or packages may be specified by specific version (e.g., major, minor, or micro), or a combination of both; for example, 'NumPy==1.2.1, NumPy==1.3.2, pandas, requests==*' In additional example embodiments, the cloud data platform can support ranges, such as <=and >=, or other conventions.

In accordance with some example embodiments, creating (e.g., setting and unsetting) a packages policy object using SQL for creating a PythonPackagesPolicy can be expressed as:

CREATE [OR REPLACE] PYTHON PACKAGES POLICY [IF NOT EXISTS]
    <NAME>
      [ALLOWLIST=(['packageSpec1'][, 'packageSpec2', . . . ])]
      [BLOCKLIST=(['packageSpec1'][, 'packageSpec2', . . . ])]
      [COMMENT='<string_literal>'];

If a user fails to specify a particular field, that field can be set to the default (e.g., ("*") for allowlist, (" ") for blocklist). In order to create this object, users may need a new grantable privilege (e.g., CREATEPYTHONPACKAGEPOLICY).

In some example embodiments, unsetting a packages policy object at the account level may require different privileges in order to perform one or more operations. For example, the operation of creating a packages policy requires the privilege to CREATE the policy on SCHEMA; the operation of altering a packages policy requires the privilege of OWNERSHIP on the PACKAGES POLICY; the operation of dropping a packages policy requires the privilege of OWNERSHIP or APPLY on the PACKAGES POLICY; the operation of showing a packages policy requires the privilege of OWNERSHIP or APPLY on the PACKAGES POLICY; and the operation of setting/unsetting account packages policy requires the privilege of OWNERSHIP or APPLY on the PACKAGES POLICY and apply PACKAGES POLICY on the account.

According to some example embodiments, one list may take precedence over another list in different scenarios, use cases, or based on customer preference. For example, as a default (that may be changed) the blocklist can take precedence over the allowlist in all cases. More specifically, if a package is specified in both the allowlist and the blocklist, then the dependency solver system 715 should generate a solve failure (e.g., not be able to create or run the UDF) since it is blocked. As part of this, the default setting for the allowlist can be ("*"), which means all packages are allowed, and the default setting for the blocklist will be empty.

Additional example embodiments may include default and grantable privileges to overwrite a current list (e.g., allowlist, blocklist) with a new one, to update the list incrementally with new packages and/or versions of packages, to remove entries from the list(s), to clear the list(s), and the like.

Returning to the packages policy object 230, according to some example embodiments, users who have OWNERSHIP or APPLY ON the packages policy may see the packages policy. The allowlist and blocklist may not be visible to users who do not have these privileges. For example, if a user's UDF does not pass the packages policy (e.g., solve determination 710), then an error message can provide output (e.g., feedback) that it failed due to the packages policy. In some example embodiments, such error messages will not provide the contents of the allowlist and blocklist to all users.

In other example embodiments, the cloud data platform (or a component thereof) can provide an INFORMATION_SCHEMA.POLICY_REFERENCES view, which can contain all of the packages policy objects that are set on the account. In additional example embodiments, to surface the allowlist and blocklist to users, the user can call a system function that will provide to see those lists. The cloud data platform provides for users who cannot resolve the packages policy to be able to understand why their UDF creation and/or UDF execution is failing. For example, if the function creation or function execution is failing due to the fact that a required package is not allowed by the customer's allowlist and blocklist.

In alternative example embodiments, the application of the allowlist and blocklist may only be applied to packages that are being used within an account; for example, as long as these functions are created by their own users and the customer has accepted any necessary or required terms. In some example embodiments, the cloud data platform may not apply an allowlist and blocklist. For example, the allowlist and blocklist may not be applied to native application(s), since the allowlist and blocklist may only be applied for functions created by the current account. In other examples, the allowlist and blocklist may not be applied to cloud data platform built-in shared functions since the owner of these functions is the cloud data platform.

Figure 6:
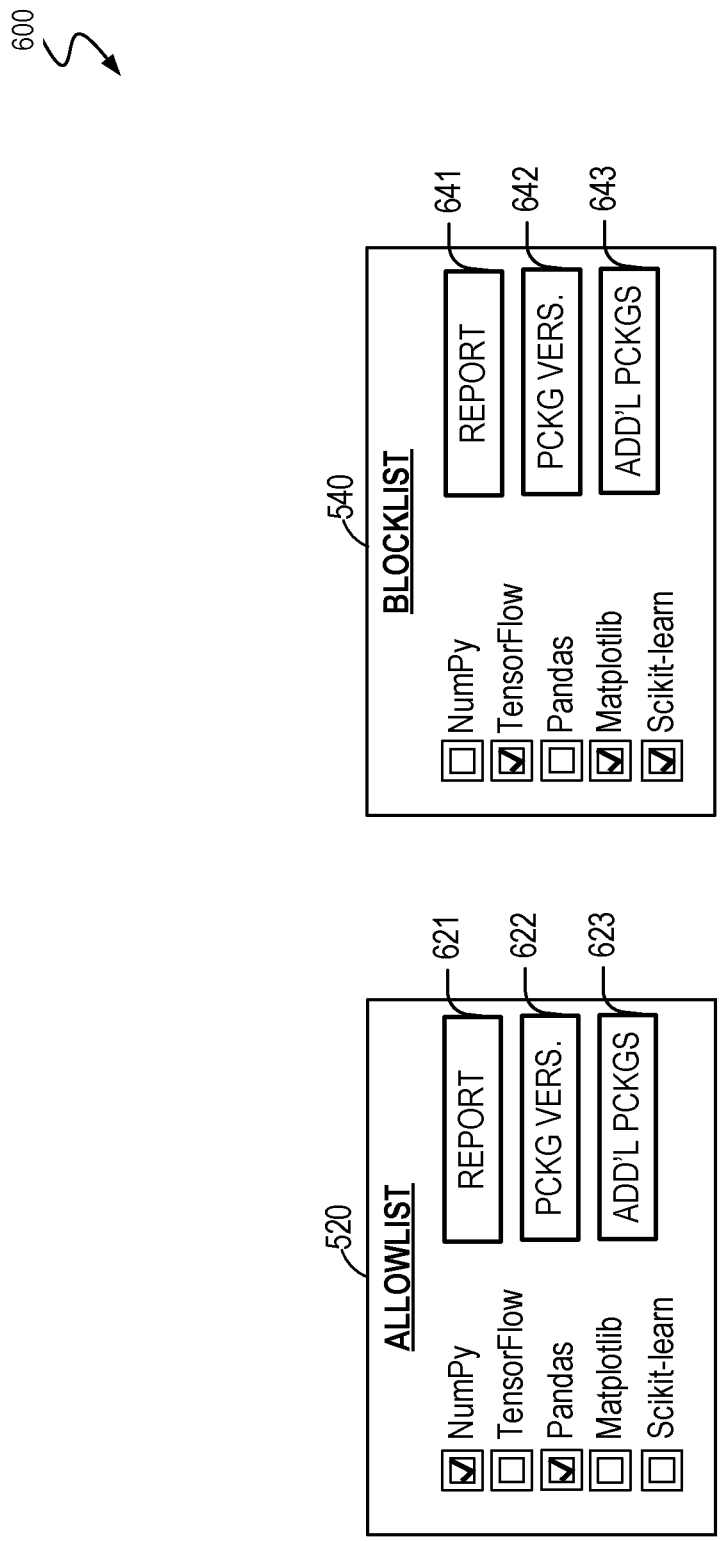
FIG. 6 is a block diagram illustrating an allowlist and a blocklist for controlling access to packages, according to example embodiments.

FIG. 6 is a block diagram 600 illustrating the allowlist 520 and the blocklist 540 for identifying packages to be allowed and packages to be restricted, in accordance with example embodiments.

Example embodiments of the packages and/or sets of packages can include thousands of packages made available via a cloud data platform 102 covering a wide range of use cases in a variety of programming languages; for example, Python packages can include Matplotlib, Scikit-learn, TensorFlow, Flask, Django, mkl, NumPy, Pandas, etc. For simplicity, example embodiments presented throughout refer to Python packages mkl, NumPy, and Pandas. Where mkl stands for "Math Kernel Library," which is used as a dependency in scientific computing packages to improve the performance of mathematical functions. Where NumPy stands for "Numerical Python," which is a Python library for numerical computing and provides an efficient way to work with large, multi-dimensional arrays and matrices of numerical data. Where Pandas is a Python library used for data manipulation and analysis and provides data structures for efficiently storing and analyzing large datasets, as well as functions for transforming and cleaning data. However, it will be understood that other packages can similarly apply.

Example embodiments of the allowlist 520 and the blocklist 540 can include varying semantics applicable for different customers of the cloud data platform 102. For example, in order for a package to be allowed, it needs to match the allowlist, and not be blocked by the blocklist. This is because the blocklist will override the allowlist. If the allowlist is not specified, then it can default to value "*" If the blocklist is not specified, then it will default to value " " (e.g., empty). In some example embodiments, a customer can specify account(s) or environments in which such semantics may not apply. For example, for a product development environment, the allowlist may always override the blocklist. For example, if a particular version of a package is not explicitly allowed in the allowlist, then it is implicitly disallowed (e.g., if pandas==0.6.*, pandas==0.7.*, then pandas==0.8.1 is disallowed, but pandas==0.6.0, 0.6.1, 0.7.0, 0.7.1, etc. are allowed).

The allowlist 520 can include additional options for changing package versions 622, viewing additional packages 623, and generating one or more allow reports 621. The report 621 can be a generation mechanism that can be run by customers that desire a well-structured record of the specific packages and/or versions of packages that the customer is using in the cloud data platform over periods of time. For example, in highly regulated industries, customers may be required by law to submit to audits that would ensure organizations are not using any industry-restricted packages or packages with possible security vulnerabilities. Organizations can maintain separate accounts on the cloud data platform 102 for different environments and those environments may have different security requirements. For example, for a development environment, an organization may want to allow any and all packages for testing and development purposes, but under production environments, the organization may want to make sure only approved packages make it through to the environment to ensure data security is controlled. The report 621 can provide a subset or superset of the packages the customer is using in the cloud data platform, providing different reports for different accounts or environments.

In some example embodiments, the allowlist 520 and the blocklist 540 can include more specialized reports than report 517. For example, the allowlist 520 can include a report 621 directed toward the specific allowed packages or versions of packages and the blocklist 540 can include a report 641 directed toward the specific blocked packages or versions of packages. The blocklist 540 can include similar additional options for changing package versions 642, viewing additional packages 643, and block reports 641.

Similar to the allowlist 520, example embodiments of the blocklist 540 can be created and controlled according to the packages policy object in order to block specific packages, sets of packages, and/or versions of packages from being used. As noted above, while a general block list may exist that stops all use of any packages on the block list, a user would simply be totally restricted from using such a package. However, according to example embodiments of the present disclosure, a packages policy object incorporating allowlist(s) and blocklist(s) integrated directly with a package solver (e.g., the dependency solver system 715), enables the cloud data platform to determine all of the dependencies and versions of packages that are needed so if one package is not allowed (e.g., on the blocklist 540), the system can identify solutions to overcome the blocklist and enable the user to find an environment or execute a UDF despite the existence of a blocklist.

According to some example embodiments of the present disclosure, a blocklist 540 can be used if an organization of the cloud data platform has not had time to determine if the customer wants their users to have access to a specific package, so the organization can block access initially, and at any time, unblock the access and provide authorization to use it (e.g., by adding the package to the allowlist 520 and/or removing the package from the blocklist 540). In addition to blocking or allowing (e.g., authorizing) entire packages, the organization can specify versions of the packages to block. This will allow the organization not to auto-upgrade their packages without testing or exploring the newer versions first.

The blocklist 540 can be used if an available package receives a new Common Vulnerability Scoring System (CVSS) score or Common Vulnerabilities and Exposures (CVE) score. The customer can immediately block all access to that specific package, which will cause the package to be blocked from user access, stop all existing UDFs or stored procedures from using the package or being able to use the package, which will, in turn, protect the customer's data on the cloud data platform. In some example embodiments, a customer can receive automated reports related to identified vulnerabilities and bugs, the packages policy object can automatically add any identified packages or versions of packages to the blocklist 540.

For example, if a blocklist 540 is specified, creation of a UDF should also fail if the frozen solve has any packages that are identified in the blocklist. This is different from the allowlist, because this list applies to ALL of the packages in the frozen solve. For example, this enables account administrators to have more fine-grained control over what packages not to use, since the most likely use case is to block certain versions of a package due to some CVE report. Similar to the allowlist 520, if a UDF is created and then the blocklist 540 is changed to block a package in the frozen solve, then the UDF will not be allowed to run. For example, the frozen list generated by the solver generally contains the highest available version of packages. The frozen list can hold the list of packages needed to create the environment (e.g., Python environment) that the user code is going to execute in. When a function (e.g., Python function) is actually executed, the cloud data platform 102 or component thereof downloads the packages that are stored in the frozen solve list.

In additional example embodiments, the allowlist and blocklist can apply differently at different package levels and/or for different package versions. In some examples, the allowlist 520 and the blocklist 540 can apply to all of the dependencies of at least one package specification (e.g., all packages, top-level packages, based on other dependencies or versions, etc.). In other examples, an allowlist can be implanted with restrictions, for example, the allowlist can only apply to top-level packages. This way, users will not be required to solve for the packages that they want to allow. For example, the package-level allowlist can only apply to the top-level packages that a user specifies (e.g., the packages that are specified in the PACKAGES field for CREATE FUNCTION DDL). The dependencies that the top-level packages pull in are implicitly allowed unless they are explicitly denied by the blocklist. This means that if a top-level package is allowed by the allowlist, but one or more of its dependencies is not due to the blocklist, then the solve will fail. However, if there is another way for the dependencies to be resolved, via a different package or version, then the function creation should succeed.

For example, in additional example embodiments, in the case where both a package-level and an all-packages allowlist are specified, the all-packages allowlist is applied, since it is more restrictive. The order in which the cloud data platform or component thereof (e.g., the dependency solver system 715) honors the allowlists can also be changed. For example, it may default as follows: 1. All-packages allowlist, and 2. Top-level allowlist, where all-packages allowlist is the highest priority.

Figure 7:
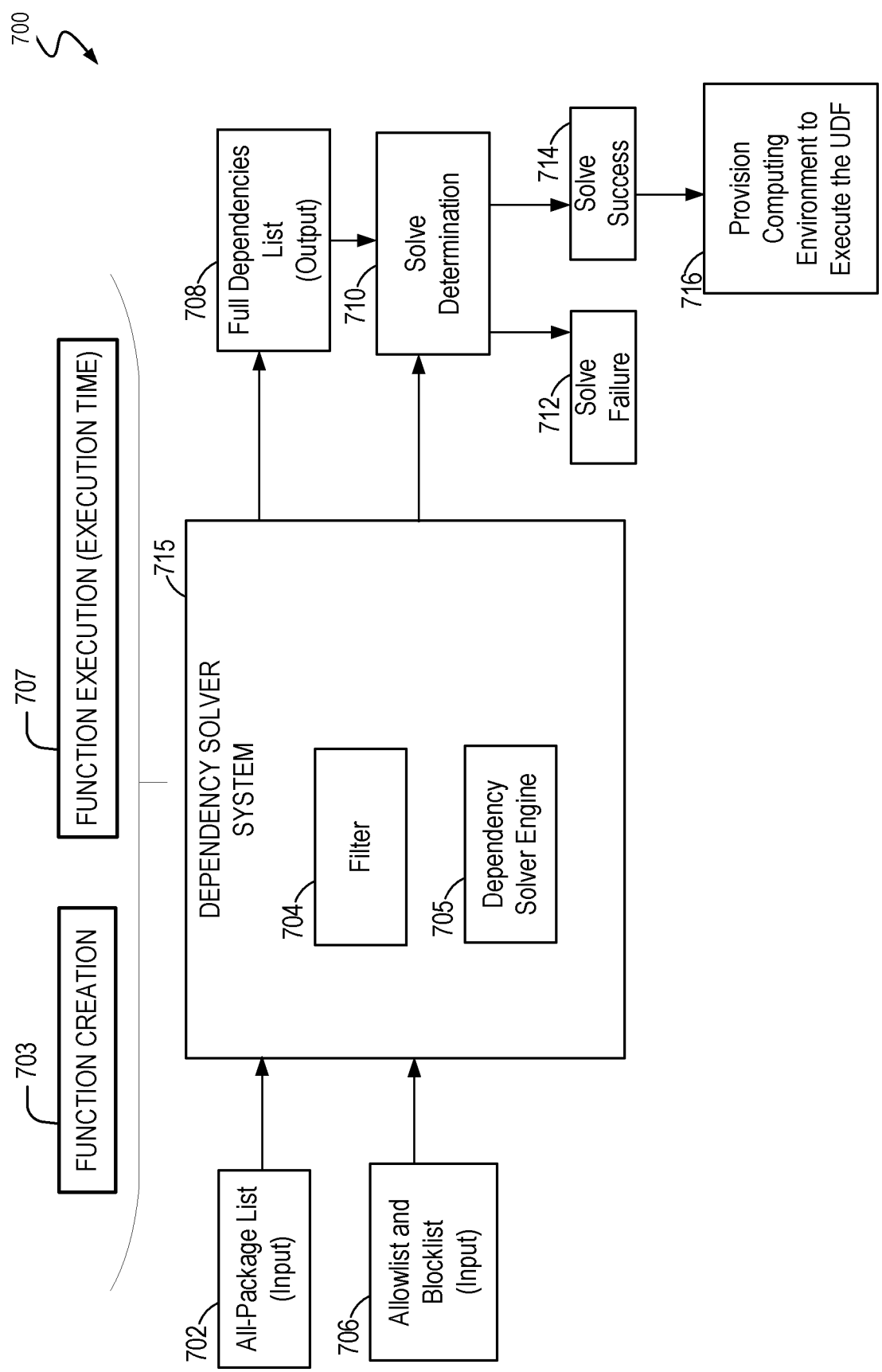
FIG. 7 is a block diagram depicting a dependency solver system for determining a usable computing environment, according to some example embodiments.

FIG. 7 shows a block diagram 700 depicting a dependency solver system 715 for determining a usable computing environment based on a customer's package restrictions, according to some example embodiments. According to one example embodiment, the allowlist and blocklist 706 are provided as input into the dependency solver system 715 for the solver to determine compliance with the packages policy defined by the customer.

According to some example embodiments, in order to determine acceptable compliance with a packages policy, the dependency solver system 715 must solve for a package to be allowed (e.g., a solve to be successful), the package must be explicitly allowed by the allowlist and not explicitly blocked by the blocklist. The dependency solver system 715 can be a function that receives a set of specified packages and metadata about what packages are available in order to solve for a user specified UDF and for a specific computing environment.

According to some example embodiments, the dependency solver system 715 can be a component of the cloud data platform 102, a component of the compute service manager 108, a component of the execution platform 110, or an external (e.g., third-party component) operatively interconnected thereto. For example, database managers, such as the solver manager 109 and/or the packages policy object 230, can be operatively interconnected with a dependency solver system 715 to determine if one or more execution environments can be configured for different types of dependencies (e.g., programming language versions, CPU requirements, etc.) and/or to identify if one or more UDFs can be created and/or executed according to customer packages policies.

For example, the dependency solver system 715 can receive all of the packages that are available to the cloud data platform (e.g., all packages without allowlist and blocklist information), and the dependency solver system 715 executes and outputs a full list of all dependencies that are required to make the input specified packages work. For example, if the input specified packages included NumPy and Pandas, the dependency solver system 715 will output a list of, for example, approximately 20-30 Python packages that are required to create an environment where the end-user can use NumPy and Pandas.

The dependency solver system 715 can include a dependency solver engine 705 that solves for different dependencies of a given programming language function and/or application that are needed for execution of the user function using the cloud data platform. In some example embodiments, the dependency solver engine 705 generates a configuration file (e.g., a yaml file) that specifies which packages are to be installed for a given user function (e.g., a Python UDF). In some example embodiments, the dependency solver system 715 receives, as input, an all-package list 702 (e.g., an allowlist) that is a repository of packages (e.g., full Python packages repository). In other example embodiments, the dependency solver system 715 can otherwise obtain or maintain the all-package list 702 within the system.

The all-package list 702 can be a repodata.json file that contains metadata about a software repository. It is often used in the context of package managers (e.g., Conda or Anaconda) to store information about the packages available in a particular repository. The repodata.json file or package data file typically includes information such as the package name, version number, dependencies, and checksums. This information is used by package managers to resolve dependencies, download packages, and verify the integrity of the downloaded files.

The dependency solver system 715 can further include a filter 704, such as a metadata filter, for pruning the metadata from the allowlist and blocklist 706 so that only packages allowed by the customer's packages policy are made available. This will result in a successful solution (e.g., solve determination) if the packages are allowed, otherwise it will fail the query.

When the solve determination 710 produces a solve success 714, the cloud data platform or component thereof (e.g., such as the execution platform 110) provisions a computing environment 716 (e.g., cluster) according to the user-defined requirements (e.g., compute resources, memory, etc.) and installs the required dependencies for the UDF based on the user-defined specifications. According to example embodiments, the installation of the required dependencies (which can also include other installations, such as libraries, etc.), is based on the customer's allowlist and blocklist providing the customer with granular control of the specific packages from all third-party packages made available via the cloud data platform 102.

The dependency solver system 715 can identify a version of a package or a different package that is not strictly blocked and is therefore allowed by the allowlist, so the end-user can still be provided with a constructed environment that the user needs. In additional example embodiment, once the different packages for a given function are solved, the dependency solver system 715 retrieves the required packages that comply with the customer's packages policy (e.g., allowed by allowlist and not blocked by blocklist) from a repository and configures one or more execution environments. The execution environments are configured for different versions of the programming language (e.g., Python version 2.7 in a first environment and Python version 3.8 in a second environment), in accordance with some example embodiments.

When the solve determination 710 produces a solve failure 712, the cloud data platform or component thereof will provide a solve failure notification to the user. For example, if the dependency solver system 715 determines that the required dependencies are not allowed according to the customer's allowlist, then the solve will fail. If the required dependencies are blocked by the customer's blocklist, then the solve will also fail. In the case where only a certain version of a package is blocked by the customer's blocklist, but the dependency solver system 715 determines it is possible to solve input with another version or a different package that is allowed by the customer, then the dependency solver system 715 will identify those packages.

According to some example embodiments, the allowlist applies to all of the packages being used by the dependency solver system 715, which would include all the dependencies of the packages (e.g., specified in a PACKAGES field for CREATE FUNCTION DDL). If a UDF is created, and then the allowlist is changed to no longer include all of the packages in the solve determination 710, then the UDF will not be allowed to run (e.g., solve failure). In some example embodiments, if a particular version of a package is allowed, then all the other versions of that package are implicitly disallowed.

According to example embodiments, the allowlists and blocklists can be applied during function creation 703 and function execution 707 (e.g., execution time).

In the example of FIG. 7, when the allowlists and blocklists are applied during function creation 703, when a user is creating a function (e.g., UDF), the cloud data platform can employ the dependency solver system 715 in different ways in order to efficiently determine if the function can be created.

In a first example embodiment, the cloud data platform can remove all of the entries that are blocked or not allowed before passing a packages file (e.g., a repodata.json file) as input to the dependency solver system 715. The cloud data platform can then request the dependency solver system 715 to solve for the package specifications. This can include passing the allowlist and blocklist from compute service manager 108 to execution platform 110.

In a second example embodiment, the dependency solver system 715 can receive an all-package list 702 and the allowlist and blocklist 706 as input. Upon receiving a solve determination 710 (e.g., frozen solve), the cloud data platform or component thereof (e.g., the compute service manager 108) can remove all the un-allowed packages that are either blocked or not included in the allowlist.

In the example of FIG. 7, when the allowlists and blocklists are applied during function execution 707 (e.g., execution time), the cloud data platform can employ the dependency solver system 715 in different ways in order to efficiently determine if the function can be executed (e.g., a computing environment can be provisioned).

In a first example embodiment, the cloud data platform can modify the packages data file so only packages allowed by the allowlist and blocklist are present, before passing the packages data file to the dependency solver system 715. In some such example embodiments, in the event of a top-level allowlist, the cloud data platform may only remove packages specified in the allowlist and not remove the top-level packages' dependencies. In such an example embodiment, the output of the dependency solver system 715 will always provide an error (e.g., solve failure 712) if the solve is not possible.

In a second example embodiment, the cloud data platform or component thereof can verify the output of the dependency solver system 715 (e.g., the full dependencies list 708 and or the solver determination 710) and cause a solve fail 712 if any of the resulting packages do not pass the allowlist and blocklist. Here, the cloud data platform can verify the output of the dependency solver system 715 and parse the output to determine if all of the packages in the frozen solve are allowed. If some packages are not allowed (e.g., on the blocklist and/or not on the allowlist), then the cloud data platform can provide an error message (e.g., solve failure 712), which will fail any function execution and/or environment provisioning. For example, if the highest version for a dependency is 'mkl==1.2.3', but 'mkl==1.2.2' is also available and satisfies the dependency constraints, the dependency solver system 715 will always try to pick mkl==1.2.3. If only mkl==1.2.3 is blocked, then the frozen solve will never be allowed since it contains mkl==1.2.3. However, according to this example embodiment, if mkl==1.2.3 is removed from the repodata.json file, then the dependency solver system 715 can select mkl==1.2.2 and the UDF will be able to be created.

In a third example embodiment, at execution time, the cloud data platform or component thereof can exclude all packages that are blocked by the blocklist. If the resulting environment breaks because the allowlist and blocklist was updated in between function creation 703 and function execution 707, the cloud data platform can generate an error message for users to recreate the UDF. In such an example embodiment, the cloud data platform retains access to the frozen solve and can continuously verify it against the allowlist and blocklist in the compute service manager 108, the solve determination 710 would cause a solve failure 712 and fail if any of the packages in the frozen solve are not permitted.

According to additional example embodiments, the cloud data platform can perform a check or verification of the top-level packages in the compute service manager 108 for every element in the package specification list (e.g., some example embodiments Table 1 below). If the package specification does not satisfy the conditions in the allowlist (e.g., package spec: numpy==0.9.1, allowlist: numpy==1.0.0), or the package specification is not shown in the allowlist (e.g., package spec: numpy==0.9.1, allowlist: pandas==*), the cloud data platform will provide an error. If the package specification has been blocked by blocklist (e.g., package spec: numpy==0.9.1, blocklist: numpy==0.9.1), the cloud data platform will provide an error. After these two checks are completed, all of the package specifications have satisfied the conditions in allowlist and blocklist.

As an example, a simplified scenario is provided illustrating a small number of packages (e.g., three packages) in a file used by the cloud data platform 102 and/or the package manager to store metadata about the packages available in a package repository; the file containing information including package name, version, dependencies, URL, and the like. The package data file (e.g., a repodata.json file) can be used by the cloud data platform 102 and/or package manager to determine the latest available version of a package and its dependencies, which help to ensure that software dependencies are properly managed, and packages are installed correctly and/or environments can be rendered properly (e.g., without faults due to incompatible or blocked packages).

```
::::::CODE::::::
"packages": {
    "NumPy-0.20.1.abcd.tar.bz2": {
        "depends": [
            "mkl >= 1.2",
            "pandas >= 0.6.0, pandas <= 0.7.0"
        ]
    },
    "mkl.1.2.3.abcd.tar.bz2": {
        "depends": [ ]
    },
    "mk1.1.2.4.abcd.tar.bz2": {
        "depends": [ ]
    },
    "mkl.1.2.5.abcd.tar.bz2": {
        "depends": [ ]
    },
    "pandas.0.6.0.abcd.tar.bz2": {
        "depends": [ ]
    },
    "pandas.0.7.1.abcd.tar.bz2": {
        "depends": [ ]
    },
}
::::::CODE::::::
```

In the above example, the data file provides the available package versions and dependencies to be used by the dependency solver system 715 to compare against the customer's allowlist and/or blocklist 706. It can be interpreted as follows: NumPy==0.20.1 requires any version of mkl that is >=1.2, and any version of pandas >=0.6.0 and <=0.7.0. For simplicity's sake, we also have mkl==1.2.3, mkl==1.2.4, mkl==1.2.5, pandas==0.6.0, and pandas==0.7.1, each of which do not have any other dependencies. Then, the packages policy defined by a user (e.g., customer, account, etc.) provides the allowed packages, and more specifically, the allowed versions of specific packages for that user.

Table 1 is an example of a matrix for a top level allowlist, according to the example packages policy above displaying an allowlist, blocklist, package specifications, output, and notes as follows:

TABLE 1

| Allowlist | Blocklist | Package Spec | Output | Notes |
|---|---|---|---|---|
| Default | Default | NumPy | NumPy == 0.20.1, Mkl == 1.2.5, Pandas == 0.6.0 | The reason why this returns pandas == 0.6.0 is because the other version of pandas on the cloud data platform does not satisfy the version constraint for NumPy. |
| Default | Default | pandas | pandas == 0.7.1 | |
| Default | mkl == 1.2.5 | NumPy, pandas | NumPy == 0.20.1, mkl == 1.2.4, pandas == 0.6.0 | |
| NumPy, pandas, mkl | Default | NumPy | NumPy == 0.20.1, mkl == 1.2.5, pandas == 0.6.0 | NumPy and all of its dependencies are allowed by the allowlist. |
| NumPy == 0.20.1, pandas == 0.6.0, mkl == 1.2.4 | Default | NumPy | NumPy == 0.21.1, pandas == 0.6.0, mkl == 1.2.4 | These are the only solves for NumPy == 0.21.1 that are allowed by the packages allowlist. |
| pandas | pandas >= 0.7.* | pandas | pandas == 0.6.0 | This returns pandas == 0.6.0 because anything >= 0.7.0 is blocked, and the cloud data platform has another version of pandas that is allowed. |
| pandas == 0.6.0 | Default | pandas | pandas == 0.6.0 | This has an exact match. |

TABLE 1-continued

| Allowlist | Blocklist | Package Spec | Output | Notes |
|---|---|---|---|---|
| pandas <= 0.7.* | Default | pandas | pandas == 0.6.0 | The cloud data platform cannot use pandas == 0.7.1 here, so it defaults to the next version that matches the spec. |
| NumPy, pandas == 0.6.0, mkl | Default | pandas | NumPy == 0.20.1, mkl == 1.2.5, pandas == 0.6.0 | NumPy and all of its dependencies are allowed by the allowlist. |
| NumPy | Default | NumPy | FAILURE | This fails, because the pandas dependency is not explicitly allowed by the allowlist. |
| NumPy | Default | NumPy | FAILURE | This fails, because the dependencies for NumPy are not explicitly allowed by the allowlist. |

Table 1 includes an example of output provided from dependency determination, where such output could be included in and/or part of the full dependencies list 708 (e.g., output from the dependency solver system 715). Output may contain information related to the database in which the policy is set, the schema in which the policy is set, the name of the policy, the kind or type of policy in the cloud data platform, the name of the database containing an object that the queried object references, the name of the schema containing an object that the queried object references, the name of the object (e.g., table name, view name, etc.) on which the policy is set, and/or the object type (e.g., table view) on which the policy is set.

Figure 8:
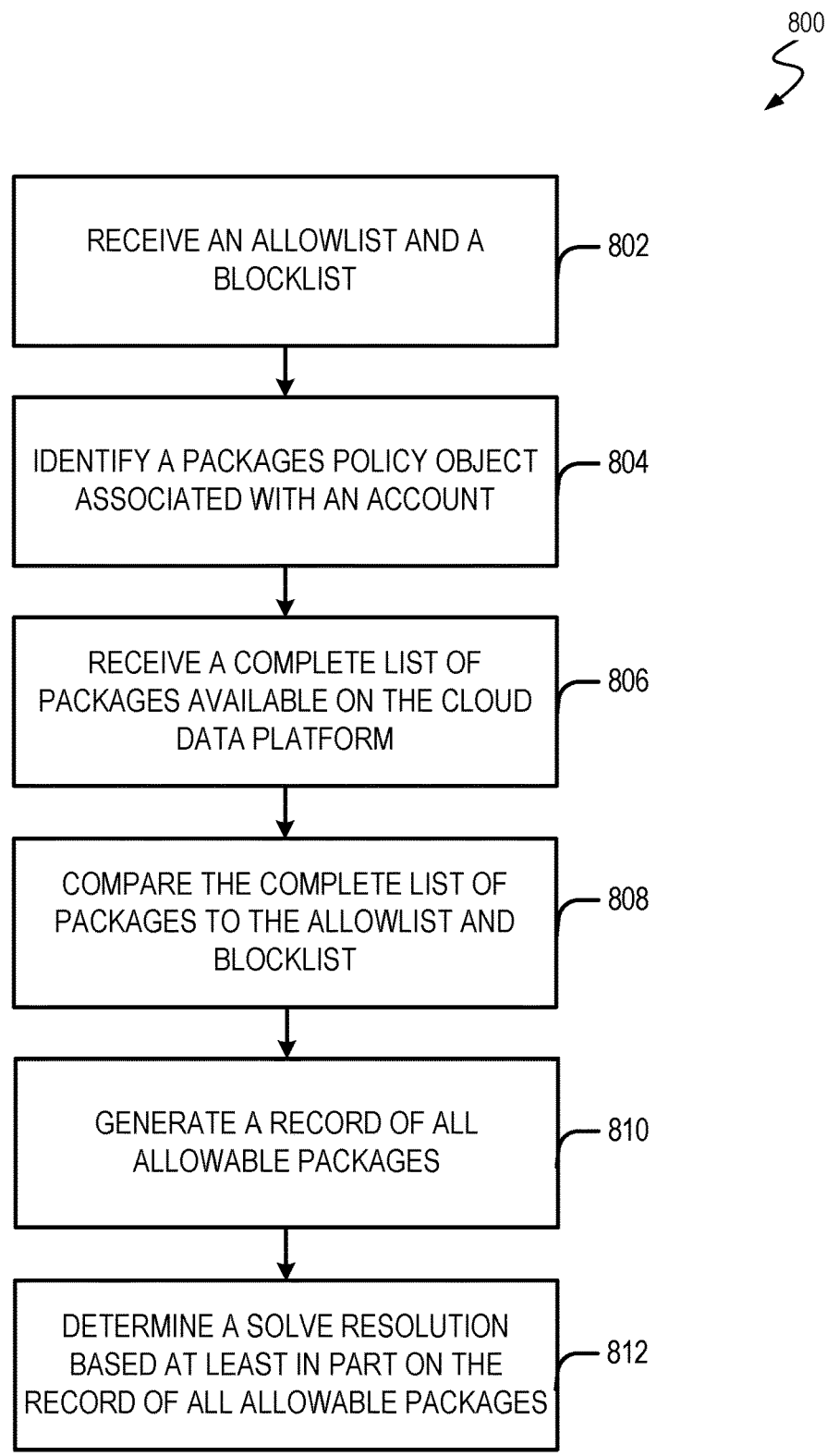
FIG. 8 is a flow diagram illustrating operations of a cloud data platform performing an example method for application of a packages policy, according to some example embodiments.

FIG. 8 depicts a flow diagram of a method 800 for applying a packages policy, according to some example embodiments. The method 800 can be embodied in machine-readable instructions for execution by one or more hardware components (e.g., one or more processors) such that the operations of the method 800 can be performed by components of the cloud data platform 102. Accordingly, the method 800 is described below, by way of example with reference to components of the cloud data platform 102. However, it shall be appreciated that method 800 can be deployed on various other hardware configurations and is not intended to be limited to deployment within the cloud data platform 102.

Depending on the embodiment, an operation of the method 800 can be repeated in different ways or involve intervening operations not shown. Though the operations of the method 800 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

Operation 802 is for receiving, by the cloud data platform 102, an allowlist and a blocklist. For example, the allowlist and blocklist can be received from the compute service manager 108, the execution platform 110, the client device 114, and/or additional external sources (e.g., operatively connected third-party platforms distinct from the cloud data platform 102).

From operation 802, the method 800 flows to operation 804 for identifying, by the cloud data platform 102, a packages policy object associated with an account of the cloud data platform. From operation 804, the method 800 flows to operation 806 for receiving, by the cloud data platform 102, a full-list of packages available on the cloud data platform. From operation 806, the method 800 flows to operation 808 for comparing, by the cloud data platform 102, the full-list of the available packages to the at least one allowlist and the at least one blocklist. From operation 808, the method 800 flows to operation 810 for generating, by the cloud data platform 102, a record of all allowable packages. From operation 810, the method 800 flows to operation 812 for determining, by the cloud data platform 102, a solve resolution based on the record of all allowable packages.

Figure 9:
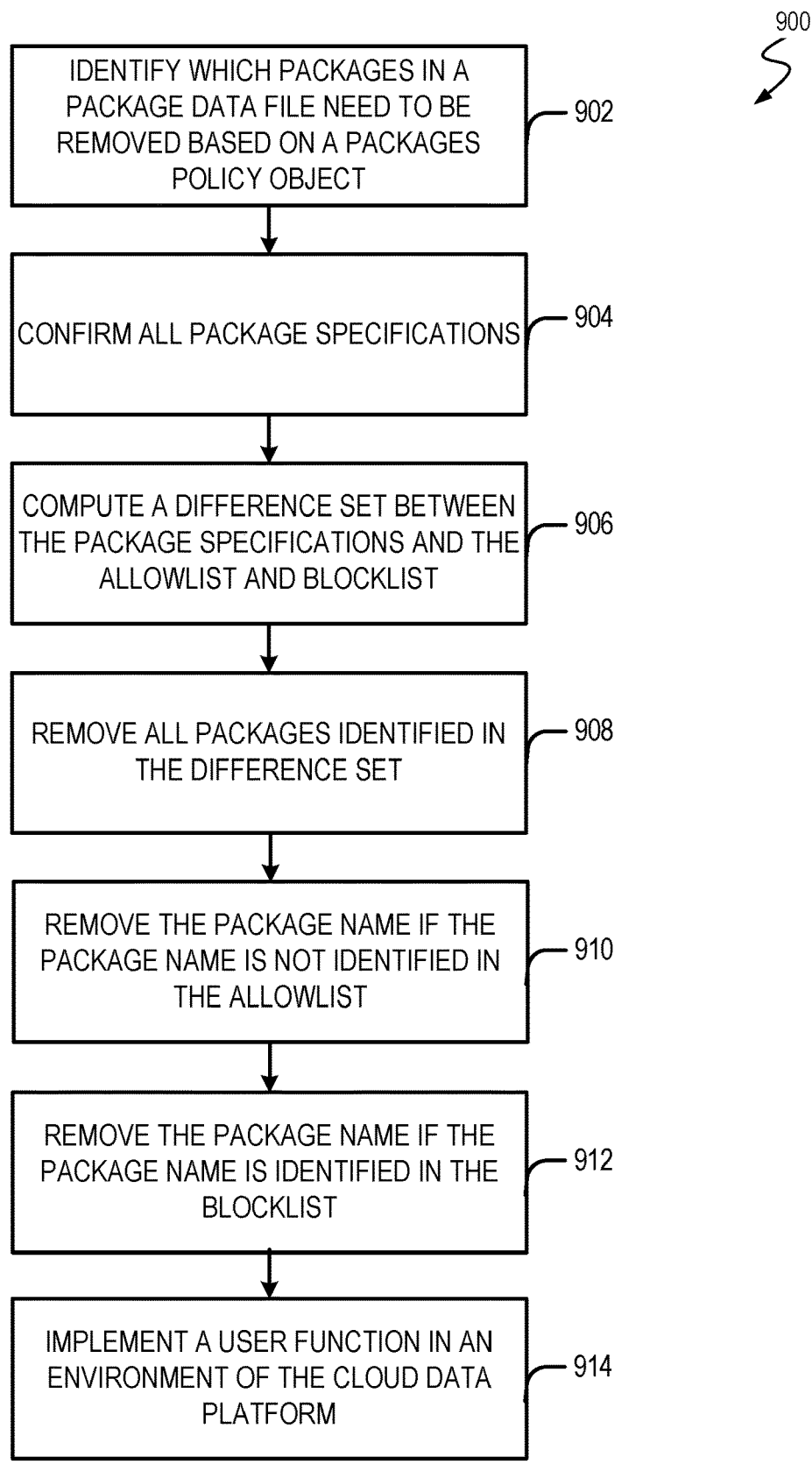
FIG. 9 shows a flow diagram of a method of implementing user-defined function (UDFs) in multiple environments on a cloud data platform, according to some example embodiments.

FIG. 9 shows a flow diagram of a method 900 for implementing a user function in one or more environments on a cloud data platform based on a packages policy object, according to some example embodiments. The method 900 can be embodied in machine-readable instructions for execution by one or more hardware components (e.g., one or more hardware processors) such that the operations of the method 900 can be performed by components of the cloud data platform 102. Accordingly, the method 900 is described below, by way of example with reference to components of the solver manager 109. However, it shall be appreciated that method 900 can be deployed on various other hardware configurations and is not intended to be limited to deployment within the solver manager 109. In some example embodiments, the method 900 can be an operation, in whole or in part, of the method 800. Depending on the embodiment, an operation of the method 900 can be repeated in different ways or involve intervening operations not shown. Though the operations of the method 900 can be depicted and described in a certain order, the order in which the operations are performed may vary among embodiments, including performing certain operations in parallel or performing sets of operations in separate processes.

Operation 902 is for identifying, at the solver manager 109, which packages in a package data file need to be removed based on the packages policy object. In a cloud data platform, a packages policy object can include one or more allowlists and/or blocklists that control access to packages or versions of packages to be used by a customer.

From operation 902, the method 900 flows to operation 904 for confirming, at the solver manager 109, all package specifications. From operation 904, the method 900 flows to operation 906, for computing, at the solver manager 109, a difference set between all the package specifications and the allowlist and blocklist. From operation 906, the method 900 flows to operation 908 for removing, at the solver manager 109, all packages identified in the difference set. From operation 908, the method 900 flows to operation 910 for removing, at the solver manager 109, the package name if the package name is not identified in the allowlist. From operation 910, the method 900 flows to operation 912 for removing, at the solver manager 109, the package name if the package name is identified in the blocklist. From operation 912, the method 900 flows to operation 914 for implementing, at the solver manager 109, a user function in an environment of the cloud data platform.

According to additional example embodiments, the solver manager 109 is configured to perform varying operations. For example, the solver manager 109 identifies which packages in a package data file need to be removed based on the packages policy object. The solver manager 109 parses the package data file to identify packages' name and version and converts from the existing format into the format of the allowlist and blocklist. The solver manager 109 checks all of the packages' specifications. If the all-package allowlist is empty this check can be omitted. The solver manager 109 computes the difference set of the package data file and the all-package allowlist and removes all the packages in the set. Next, for the allowlist, if the package name is in the allowlist (e.g., numpy==1.0, numpy==0.9), the solver manager 109 removes all of the packages with a version that is not in the allowlist. For the blocklist, if the package name is in the blocklist (e.g., numpy==1.0), the solver manager 109 removes the specific packages with the same version or within the scope.

Another general aspect is for a system that includes a memory comprising instructions and one or more computer processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

Described implementations of the subject matter can include one or more features, alone or in combination as illustrated below by way of example. Each of these non-limiting examples can stand on its own or can be combined in various permutations or combinations with one or more of the other examples. The following examples detail certain aspects of the present subject matter to solve the challenges and provide the benefits discussed herein.

Example 1 can include a method comprising: receiving, by at least one hardware processor, a user-defined function (UDF), the UDF including code related to at least one operation to be performed; receiving a package policy, the package policy including at least one allowlist and at least one blocklist; comparing the at least one allowlist and the at least one blocklist to at least one package specification; computing a difference set based on the comparison, the difference set including metadata associated with one or more packages to remove; and determining whether the UDF is permitted based at least in part on the difference set.

In Example 2, the subject matter of Example 1 optionally includes further comprising: generating a notification based on a determination that the one or more packages are within one of the at least one allowlist or the at least one blocklist.

In Example 3, the subject matter of Example 2 optionally includes wherein determining whether executing the UDF is permitted based on the difference set further comprises: determining one or more dependencies required by the UDF; comparing the one or more dependencies required by the UDF to the at least one package specification; and generating a dependency list based on the comparison.

In Example 4, the subject matter of any one of Examples 1-3 optionally include further comprising: creating one or more user roles for the package policy based on a schema of the package policy; and granting one or more usages to the one or more user roles base at least in part on the schema, the one or more usages including use privileges to access an object of the package policy.

In Example 5, the subject matter of Example 4 optionally includes wherein the object includes a property specific to the object, the property is that the object executes in a sandbox environment.

In Example 6, the subject matter of any one of Examples 1-5 optionally include further comprising: executing the package policy any time a user creates a UDF or executes a UDF.

In Example 7, the subject matter of any one of Examples 1-6 optionally include further comprising: filtering metadata according to the package policy.

In Example 8, the subject matter of any one of Examples 1-7 optionally include wherein the package policy includes: an allowlist of packages among the at least one allowlist, the packages in the allowlist being associated with an allowed package category; and a blocklist of packages among the at least one blocklist, the packages in the blocklist being associated with a blocked package category.

In Example 9, the subject matter of any one of Examples 1-8 optionally include further comprising: instantiating a user code runtime to execute the code of the UDF, the user code runtime including an access control process including an access control list.

In Example 10, the subject matter of Example 9 optionally includes further comprising: instantiating a sandbox process as a child process of a solver manager, the solver manager configured to perform the determining of whether the UDF is permitted; and instantiating the user code runtime as a child process of the sandbox process, the sandbox process configured to execute the at least one operation in a sandbox environment.

Example 11 is a system comprising: one or more hardware processors of a machine; and at least one memory storing instructions that, when executed by the one or more hardware processors, cause the system to perform operations comprising: receiving, by at least one hardware processor, a user-defined function (UDF), the UDF including code related to at least one operation to be performed; receiving a package policy, the package policy including at least one allowlist and at least one blocklist; comparing the at least one allowlist and the at least one blocklist to at least one package specification; computing a difference set based on the comparison, the difference set including metadata associated with one or more packages to remove; and determining whether the UDF is permitted based at least in part on the difference set.

In Example 12, the subject matter of Example 11 optionally includes the operations further comprising: generating a notification based on a determination that the one or more packages are within one of the at least one allowlist or the at least one blocklist.

In Example 13, the subject matter of Example 12 optionally includes wherein determining whether executing the UDF is permitted based on the difference set further comprises: determining one or more dependencies required by the UDF; comparing the one or more dependencies required by the UDF to the at least one package specification; and generating a dependency list based on the comparison.

In Example 14, the subject matter of any one of Examples 11-13 optionally include the operations further comprising: creating one or more user roles for the package policy based on a schema of the package policy; and granting one or more usages to the one or more user roles base at least in part on the schema, the one or more usages including use privileges to access an object of the package policy.

In Example 15, the subject matter of Example 14 optionally includes wherein the object includes a property specific to the object, the property is that the object executes in a sandbox environment.

In Example 16, the subject matter of any one of Examples 11-15 optionally includes the operations further comprising: executing the package policy any time a user creates a UDF or executes a UDF.

In Example 17, the subject matter of any one of Examples 11-16 optionally includes the operations further comprising: filtering metadata according to the package policy.

In Example 18, the subject matter of any one of Examples 11-17 optionally include wherein the package policy further comprises: an allowlist of packages among the at least one allowlist, the packages in the allowlist being associated with an allowed package category; and a blocklist of packages among the at least one blocklist, the packages in the blocklist being associated with a blocked package category.

In Example 19, the subject matter of any one of Examples 11-18 optionally include the operations further comprising: instantiating a user code runtime to execute the code of the UDF, the user code runtime including an access control process including an access control list.

In Example 20, the subject matter of Example 19 optionally includes the operations further comprising: instantiating a sandbox process as a child process of a solver manager, the solver manager configured to perform the determining of whether the UDF is permitted; and instantiating the user code runtime as a child process of the sandbox process, the sandbox process configured to execute the at least one operation in a sandbox environment.

Example 21 is a machine-readable storage device embodying instructions that, when executed by a machine, cause the machine to perform operations comprising: receiving, by at least one hardware processor, a user-defined function (UDF), the UDF including code related to at least one operation to be performed; receiving a package policy, the package policy including at least one allowlist and at least one blocklist; comparing the at least one allowlist and the at least one blocklist to at least one package specification; computing a difference set based on the comparison, the difference set including metadata associated with one or more packages to remove; and determining whether the UDF is permitted based at least in part on the difference set.

In Example 22, the subject matter of Example 21 optionally includes further comprising: generating a notification based on a determination that the one or more packages are within one of the at least one allowlist or the at least one blocklist.

In Example 23, the subject matter of Example 22 optionally includes wherein determining whether executing the UDF is permitted based on the difference set further comprises: determining one or more dependencies required by the UDF; comparing the one or more dependencies required by the UDF to the at least one package specification; and generating a dependency list based on the comparison.

In Example 24, the subject matter of any one of Examples 21-23 optionally include further comprising: creating one or more user roles for the package policy based on a schema of the package policy; and granting one or more usages to the one or more user roles base at least in part on the schema, the one or more usages including use privileges to access an object of the package policy.

In Example 25, the subject matter of Example 24 optionally includes wherein the object includes a property specific to the object, the property is that the object executes in a sandbox environment.

In Example 26, the subject matter of any one of Examples 21-25 optionally include further comprising: executing the package policy any time a user creates a UDF or executes a UDF.

In Example 27, the subject matter of any one of Examples 21-26 optionally include further comprising: filtering metadata according to the package policy.

In Example 28, the subject matter of any one of Examples 21-27 optionally include wherein the package policy further comprises: an allowlist of packages among the at least one allowlist, the packages in the allowlist being associated with an allowed package category; and a blocklist of packages among the at least one blocklist, the packages in the blocklist being associated with a blocked package category.

In Example 29, the subject matter of any one of Examples 21-28 optionally include further comprising: instantiating a user code runtime to execute the code of the UDF, the user code runtime including an access control process including an access control list.

In Example 30, the subject matter of Example 29 optionally includes further comprising: instantiating a sandbox process as a child process of a solver manager, the solver manager configured to perform the determining of whether the UDF is permitted; and instantiating the user code runtime as a child process of the sandbox process, the sandbox process configured to execute the at least one operation in a sandbox environment.

Figure 10:
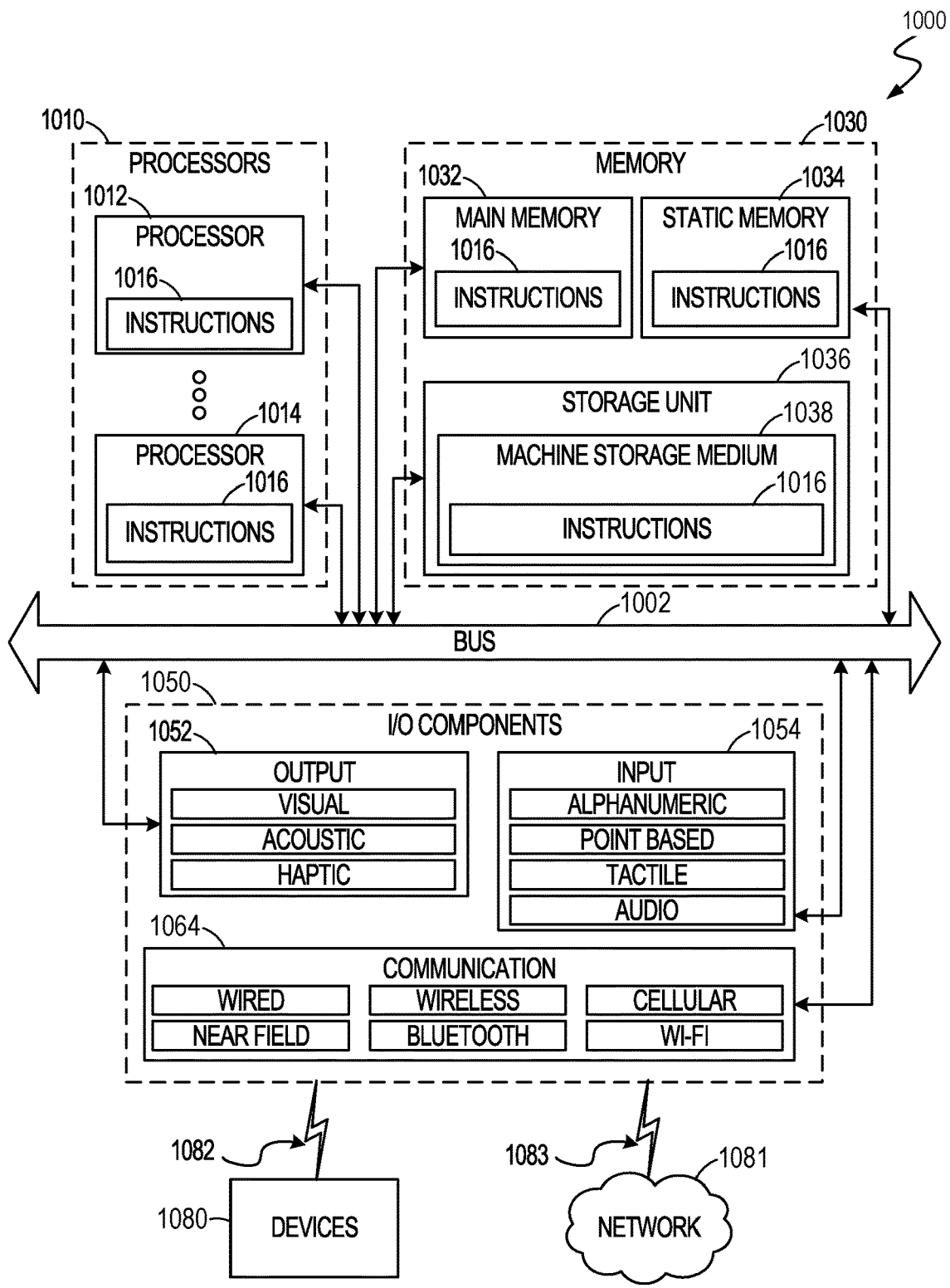
FIG. 10 illustrates a diagrammatic representation of a machine in the form of a computer system within which a set of instructions can be executed for causing the machine to perform any one or more of the methodologies discussed herein, according to some example embodiments.

FIG. 10 illustrates a diagrammatic representation of a machine 1000 in the form of a computer system within which a set of instructions can be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 may cause the machine 1000 to execute any one or more operations of any one or more of the methods described herein. As another example, the instructions 1016 may cause the machine 1000 to implement portions of the data flows described herein. In this way, the instructions 1016 transform a general, non-programmed machine into a particular machine 1000 (e.g., the compute service manager 108, the execution platform 110, client device 114) that is specially configured to carry out any one of the described and illustrated functions in the manner described herein.

In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 comprising a machine storage medium 1038 may store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1050 may include communication components 1064 operable to couple the machine 1000 to a network 1081 via a coupling 1083 or to devices 1080 via a coupling 1082. For example, the communication components 1064 may include a network interface component or another suitable device to interface with the network 1081. In further examples, the communication components 1064 may include wired communication components, wireless communication components, cellular communication components, and other communication components to provide communication via other modalities. The devices 1080 can be another machine or any of a wide variety of peripheral devices (e.g., a peripheral device coupled via a universal serial bus (USB)). For example, as noted above, the machine 1000 may correspond to any one of the client devices 114, the compute service manager 108, the execution platform 110, and the devices 1080 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1081 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1081 or a portion of the network 1081 may include a wireless or cellular network, and the coupling 1083 can be a Code Division Multiple Access (CDMA) connection, a Global System for Mobile communications (GSM) connection, or another type of cellular or wireless coupling. In this example, the coupling 1083 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 can be transmitted or received over the network 1081 using a transmission medium via a network interface device (e.g., a network interface component included in the communication components 1064) and utilizing any one of a number of well-known transfer protocols (e.g., hypertext transfer protocol (HTTP)). Similarly, the instructions 1016 can be transmitted or received using a transmission medium via the coupling 1082 (e.g., a peer-to-peer coupling) to the devices 1080. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals.

The various operations of example methods described herein can be performed, at least partially, by one or more processors that are temporarily configured (e.g., by software) or permanently configured to perform the relevant operations. Similarly, the methods described herein can be at least partially processor implemented. For example, at least some of the operations of the methods described herein can be performed by one or more processors. The performance of certain of the operations can be distributed among the one or more processors, not only residing within a single machine, but also deployed across a number of machines. In some example embodiments, the processor or processors can be located in a single location (e.g., within a home environment, an office environment, or a server farm), while in other embodiments the processors can be distributed across a number of locations.

Although the embodiments of the present disclosure have been described with reference to specific example embodiments, it will be evident that various modifications and changes can be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be used and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
receiving, by at least one hardware processor, code from a user to perform an operation in a sandbox environment;
receiving a packages policy including allowed items and restricted items, the packages policy providing an access control list;
comparing the allowed items and the restricted items to a specification that comprises metadata about packages available in a package repository;
determining one or more differences based on the comparing, the determining of the one or more differences comprising filtering the metadata according to the packages policy;
determining whether to permit the code to perform the operation based on the one or more differences by instantiating a sandbox process to execute the operation in the sandbox environment; and
transmitting, to a user device associated with the user, a message identifying the one or more differences, the message comprising an explanation associated with whether to permit the code to perform the operation based on the one or more differences.

2. The method of claim 1, wherein the comparing of the allowed items and the restricted items to the specification comprises:
confirming package specifications; and
computing a difference set between the package specifications and the allowed items and the restricted items.

3. The method of claim 2, further comprising removing all packages identified based on the one or more differences.

4. The method of claim 1, further comprising identifying components in a package file for removal based on a packages policy object of the packages policy.

5. The method of claim 1, further comprising:
removing a package name based on the package name not being identified by the allowed items or the package name being identified by the restricted items; and
implementing a user function in an environment of a cloud data platform identified by the allowed items and the restricted items.

6. The method of claim 1, wherein the packages policy includes a policy object for providing the access control list, the access control list enables customers of a cloud data platform to set the allowed items and the restricted items.

7. The method of claim 1, further comprising:
instantiating the sandbox process as a child process of a solver manager, the solver manager configured to perform the determining of whether to permit the code to perform the operation; and
instantiating a user code runtime as the child process of the sandbox process, the sandbox process configured to execute the operation in the sandbox environment.

8. A system comprising:
one or more hardware processors of a machine; and
at least one memory storing instructions that, when executed by the one or more hardware processors, cause the machine to perform operations comprising:
receiving, by at least one hardware processor, code from a user to perform an operation in a sandbox environment;
receiving a packages policy including allowed items and restricted items, the packages policy providing an access control list;
comparing the allowed items and the restricted items to a specification that comprises metadata about packages available in a package repository;
determining one or more differences based on the comparing, the determining of the one or more differences comprising filtering the metadata according to the packages policy;
determining whether to permit the code to perform the operation based on the one or more differences by instantiating a sandbox process to execute the operation in the sandbox environment; and
transmitting, to a user device associated with the user, a message identifying the one or more differences, the message comprising an explanation associated with whether to permit the code to perform the operation based on the one or more differences.

9. The system of claim 8, wherein the comparing of the allowed items and the restricted items to the specification comprises:
confirming package specifications; and
computing a difference set between the package specifications and the allowed items and the restricted items.

10. The system of claim 9, the operations further comprising removing all packages identified from the one or more differences.

11. The system of claim 9, the operations further comprising:
identifying components in a package file for removal based on a packages policy object of the packages policy.

12. The system of claim 8, the operations further comprising:
removing a package name based on the package name not being identified by the allowed items or the package name being identified by the restricted items; and
implementing a user function in an environment of a cloud data platform identified by the allowed items and the restricted items.

13. The system of claim 8, wherein the packages policy includes a policy object for providing the access control list, the access control list enables customers of a cloud data platform to set the allowed items and the restricted items.

14. The system of claim 8, the operations further comprising:
instantiating the sandbox process as a child process of a solver manager, the solver manager configured to perform the determining of whether to permit the code to perform the operation; and instantiating a user code runtime as the child process of the sandbox process, the sandbox process configured to execute the operation in the sandbox environment.

15. A machine-storage media embodying instructions that, when executed by a machine, cause the machine to perform operations comprising:

receiving, by at least one hardware processor, code from a user to perform an operation in a sandbox environment;

receiving a packages policy including allowed items and restricted items, the packages policy providing an access control list;

comparing the allowed items and the restricted items to a specification that comprises metadata about packages available in a package repository;

determining one or more differences based on the comparing, the determining of the one or more differences comprising filtering the metadata according to the packages policy;

determining whether to permit the code to perform the operation based on the one or more differences by instantiating a sandbox process to execute the operation in the sandbox environment; and transmitting, to a user device associated with the user, a message identifying the one or more differences, the message comprising an explanation associated with whether to permit the code to perform the operation based on the one or more differences.

16. The machine-storage media of claim 15, wherein the comparing of the allowed items and the restricted items to the specification comprises:

confirming package specifications; and computing a difference set between the package specifications and the allowed items and the restricted items.

17. The machine-storage media of claim 16, the operations further comprising removing all packages identified from the one or more differences.

18. The machine-storage media of claim 15, the operations further comprising:

identifying components in a package file for removal based on a packages policy object of the packages policy.

19. The machine-storage media of claim 15, the operations further comprising:

removing a package name based on the package name not being identified by the allowed items or the package name being identified by the restricted items; and implementing a user function in an environment of a cloud data platform identified by the allowed items and the restricted items.

20. The machine-storage media of claim 15, wherein the packages policy includes a policy object for providing the access control list, the access control list enables customers of a cloud data platform to set the allowed items and the restricted items.

* * * * *